(12) United States Patent
Pathak

(10) Patent No.: US 11,909,806 B2
(45) Date of Patent: Feb. 20, 2024

(54) SYSTEMS AND METHODS FOR ESTABLISHING HIGHLY SECURE AND RESILIENT PERSISTENT COMMUNICATION CONNECTIONS

(71) Applicant: Microsoft Technology Licensing, LLC, Redmond, WA (US)

(72) Inventor: Rajeev Ranjan Pathak, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/903,421

(22) Filed: Sep. 6, 2022

(65) Prior Publication Data

US 2022/0417314 A1 Dec. 29, 2022

Related U.S. Application Data

(62) Division of application No. 16/815,900, filed on Mar. 11, 2020, now Pat. No. 11,457,057.

(51) Int. Cl.
*H04L 67/01* (2022.01)
*H04W 4/80* (2018.01)
(Continued)

(52) U.S. Cl.
CPC .............. *H04L 67/01* (2022.05); *H04L 51/02* (2013.01); *H04L 63/0807* (2013.01);
(Continued)

(58) Field of Classification Search
CPC ....... H04L 5/0003; H04L 67/01; H04L 51/02; H04L 63/0807; H04L 67/02; H04L 67/56;
(Continued)

(56) References Cited

U.S. PATENT DOCUMENTS 7,610,390 B2 * 10/2009 Yared .................... H04L 63/102
709/227
7,870,153 B2 * 1/2011 Croft ..................... G06F 16/748
709/219

(Continued)

OTHER PUBLICATIONS

"Office Action Issued in European Patent Application No. 21704684.6", dated Oct. 30, 2023, 5 Pages.

*Primary Examiner* — Michael Won
(74) *Attorney, Agent, or Firm* — Novo TechIP International PLLC

(57) ABSTRACT

Systems and methods for providing resilient persistent connections for communication are disclosed. Methods include identifying, at a first device, a second device registered with a client connection service; obtaining, from the client connection service, a first resource identifier for delivering request messages to the second device via the client connection service; identifying, based on the obtained first resource identifier, a first target resource for a first request message directed to the second device, wherein the first target resource specifies a first host included in the client connection service; sending, to the client connection service via the data communication network, the first request message to the first target resource for delivery to the second device by the client connection service; and receiving, from the client connection service via the data communication network, a first response message provided by the second device as a response to the first request message.

27 Claims, 17 Drawing Sheets

(51) Int. Cl.
*H04L 51/02* (2022.01)
*H04L 9/40* (2022.01)
*H04L 67/02* (2022.01)
*H04W 12/06* (2021.01)
*H04W 48/16* (2009.01)
*H04L 67/56* (2022.01)

(52) U.S. Cl.
CPC ............ *H04L 67/02* (2013.01); *H04L 67/56* (2022.05); *H04W 4/80* (2018.02); *H04W 12/06* (2013.01); *H04W 48/16* (2013.01)

(58) Field of Classification Search
CPC ............ H04L 63/0815; H04L 65/1089; H04L 65/1094; H04L 65/403; H04L 67/2871; H04L 67/104; H04W 4/80; H04W 12/06; H04W 48/16
See application file for complete search history.

(56) References Cited

U.S. PATENT DOCUMENTS

| | | | | |
|---|---|---|---|---|
| 8,069,435 B1* | 11/2011 | Lai | ............ | H04L 67/51 717/106 |
| 8,144,632 B1* | 3/2012 | Chapweske | ............ | H04N 7/15 709/204 |
| 8,700,729 B2* | 4/2014 | Dua | ............ | G06Q 20/3674 705/64 |
| 9,551,983 B2* | 1/2017 | Cooper | ............ | G06Q 50/04 |
| 10,097,899 B2* | 10/2018 | Paul | ............ | H04N 21/4335 |
| 10,298,678 B2* | 5/2019 | Castro | ............ | H04L 67/10 |
| 10,686,902 B2* | 6/2020 | Muller | ............ | H04M 3/42238 |
| 10,715,564 B2* | 7/2020 | Mohamad Abdul | ............ | H04L 63/0807 |
| 11,539,817 B1* | 12/2022 | Perez | ............ | H04L 41/12 |
| 2003/0187918 A1* | 10/2003 | Burbeck | ............ | H04L 63/10 709/203 |
| 2004/0133683 A1* | 7/2004 | Keller | ............ | H04L 65/756 709/227 |
| 2006/0165060 A1* | 7/2006 | Dua | ............ | G06Q 20/401 705/76 |
| 2007/0047491 A1* | 3/2007 | Dutta | ............ | H04W 12/062 370/331 |
| 2009/0240797 A1* | 9/2009 | zu Bexten | ............ | G06Q 40/02 709/224 |
| 2010/0205541 A1* | 8/2010 | Rapaport | ............ | G06Q 10/10 715/753 |
| 2014/0331135 A1* | 11/2014 | Sukoff | ............ | H04L 65/764 715/719 |
| 2015/0074259 A1* | 3/2015 | Ansari | ............ | H04L 12/2834 709/224 |
| 2015/0356289 A1* | 12/2015 | Brown | ............ | G06F 21/35 726/7 |
| 2016/0112521 A1* | 4/2016 | Lawson | ............ | H04L 67/02 709/227 |
| 2017/0041296 A1* | 2/2017 | Ford | ............ | G06F 21/64 |
| 2018/0146056 A1* | 5/2018 | Eberlein | ............ | H04L 67/562 |
| 2019/0034460 A1* | 1/2019 | Eberlein | ............ | G06F 16/213 |
| 2020/0344084 A1* | 10/2020 | Shribman | ............ | H04L 67/1021 |
| 2021/0289047 A1* | 9/2021 | Pathak | ............ | H04L 67/01 |

\* cited by examiner

SYSTEMS AND METHODS FOR ESTABLISHING HIGHLY SECURE AND RESILIENT PERSISTENT COMMUNICATION CONNECTIONS

BACKGROUND

Data communication is often desired between client devices that are in proximity to each other. Near field communication techniques have been a common solution for such communication. Examples include Bluetooth, Bluetooth Low Energy (BLE), and Wi-Fi technologies. However, these techniques generally are insecure and non-resilient (for example, they do not offer high availability for scenarios where there are issues with connection stability). New and improved approaches for communication is desirable.

SUMMARY

A first device adapted to communicate via a client connection service, in accordance with a first aspect of this disclosure, includes a processor and a machine-readable medium storing instructions therein which, when executed by the processor, cause the device to identify a second device registered with the client connection service, wherein the second device is different than the first device. The instructions may also cause the device to obtain, from the client connection service via a data communication network, a first resource identifier for delivering request messages to the second device via the client connection service. Furthermore, the instructions may cause the device to identify, based on the obtained first resource identifier, a first target resource for a first request message directed to the second device, wherein the first target resource specifies a first host included in the client connection service. The instructions also cause the device to send, to the client connection service via the data communication network, the first request message to the first target resource for delivery to the second device by the client connection service. Also, the instructions cause the one or more processors to receive, from the client connection service via the data communication network, a first response message provided by the second device as a response to the first request message.

A method of communicating between devices via a client connection service, in accordance with a second aspect of this disclosure, includes identifying, at a first device, a second device registered with a client connection service, wherein the second device is different than the first device. The method may also include obtaining, at the first device from the client connection service via a data communication network, a first resource identifier for delivering request messages to the second device via the client connection service. The method may further include identifying, at the first device based on the obtained first resource identifier, a first target resource for a first request message directed to the second device, wherein the first target resource specifies a first host included in the client connection service. In addition, the method includes sending, by the first device to the client connection service via the data communication network, the first request message to the first target resource for delivery to the second device by the client connection service. Also, the method includes receiving, at the first device from the client connection service via the data communication network, a first response message provided by the second device as a response to the first request message.

A method of communicating between devices via a client connection service, in accordance with a third aspect of this disclosure, includes assigning, by a client connection service, a first resource to a first device. The method may also include receiving, at the client connection service, a first request message sent by a second device to a first target resource, wherein the second device is different than the first device. The method may further include selecting the first device based on the first target resource corresponding to the first resource. In addition, the method includes generating, by the client connection service, a first forwarded request message based on the received first request message. Also, the method includes transmitting, via a first transport channel, the first forwarded request message from the client connection service to the first device. The method may further include receiving, at the client connection service from the first device via the first transport channel, a first response message to the first forwarded request message. The method also includes transmitting, from the client connection service to the second device, a second response message generated based on the first response message as a response to the first request message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

Figure 1A:
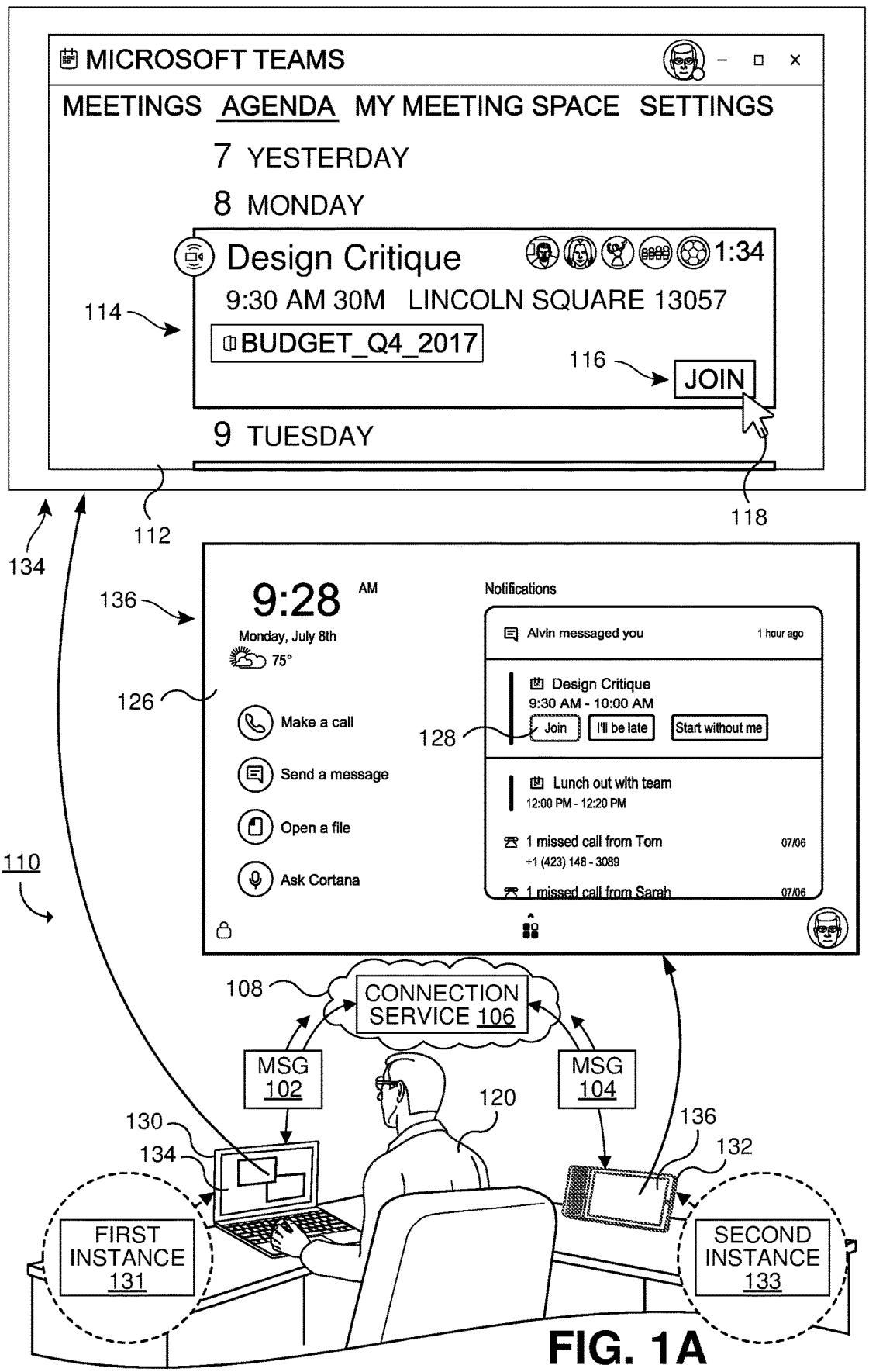
FIGS. 1A and 1B illustrate an example of a client connection service being used to establish a connection between two user computing devices for exchanging messages between the two user computing devices.
Figure 1B:
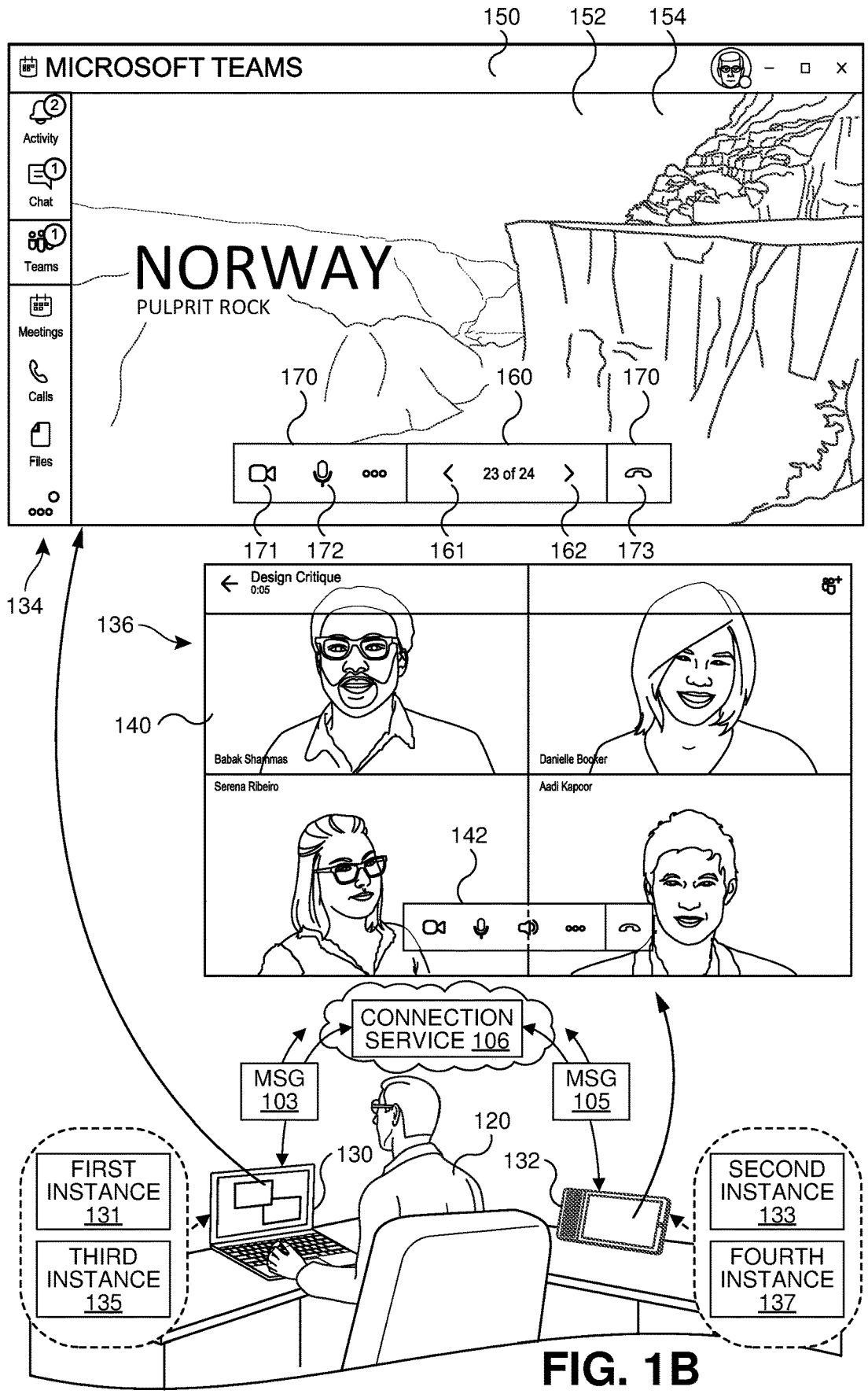

FIGS. 1A and 1B illustrate an example of a client connection service 106 (labeled "CONNECTION SERVICE") being used to establish a connection between two user computing devices 130 and 132 for exchanging messages between the two user computing devices 130 and 132. The term "user computing device" relates to an end user-oriented computing device on which it is generally assumed a single user is making use of the device at a given time. For example, a software program executed by a user computing device may require a password or other credentials be supplied in order to access resources associated with a user account. In some examples, a user computing device may support multiple such user accounts, allowing different users to "log in" to the device at respective times. In some examples, a user computing device may support a single user account; for example, most smartphone devices assume use in connection with a single individual. A "user computing device may" be more simply referred to as a "device."

In the particular example shown in FIG. 1, the first device 130 is a portable computing device in the form of a notebook or laptop computing device, and the second device 132 is a tabletop computing device including a touchscreen, camera, microphone, and loudspeaker. However, it is understood that the first device 130 and/or the second device 132 may be implemented in other forms. In some examples, a user computing device offers a capability not offered by another user computing device. For example, in FIG. 1 the first device 130 includes a physical keyboard whereas the second device 132 does not include a physical keyboard. As another example, the second device 130 includes a touchscreen whereas the first device 132 does not include a touchscreen.

A first software program instance 131 (which, in some examples, may be referred to as a "software instance," "application," or an "app") is being executed by the first device 130. Among other things, the first instance 131 is configured to interact via one or more networks with the client connection service 106 in connection with a first user identifier associated with the first user 120. The interactions may include, for example, commands and/or data sent and received between the first instance 131 and the client connection service 106 to effect aspects of the techniques described herein. These interactions may be implemented via, for example, persistent connections, asynchronous communications, and/or polling for transferring messages 102 (labeled "MSG") between the first instance 131 executed by the first device 130 and the client connection service 106. It is understood that references to a user computing device interacting with, or being configured to interact with, the client connection service 106 occurs via a correspondingly configured software program instance executed by the user computing device. Additionally, a second software program instance 133 is being executed by the second device 132. Much as described for the first instance 131, the second instance 133 is configured to interact via one or more networks with the client connection service 106 in connection with the user identifier for the first user 120. Thus, in the example shown in FIG. 1A, both the first device 130 and the second device 132 are configured to interact with the client connection service 106, and do interact with the client connection service 106, in connection with the first user 120.

In some implementations, a user may perform a pairing procedure to identify user computing devices and/or instances as eligible for pairing with each other. In the example shown in FIG. 1A, the first instance 131 executing on the first device 130 and the second instance 133 executing on the second device 132 have been identified as eligible for pairing together. A set of user computing devices and/or instances that have been paired via a pairing procedure may be referred to as being "actively paired" and as being included together in an actively paired set during periods of time that the set of devices and/or instances is able to actively communicate via the client connection service 106. In some examples, a set of user computing devices and/or instances may transition to or from being actively paired based on their proximity to one another and/or a common user.

A system, including the devices 130 and 132 and the client connection service 106, is configured to control the presentation of user interfaces by instances for various activities based on whether the involved instances are or are not actively paired during associated periods of time. In some examples, a user interface presented by an instance via a user computing device may be modified (including, but not limited to, adding a displayed user interface (UI) element, removing a displayed UI element, and/or changing an appearance of a displayed UI element) in response to the system identifying the instance as having transitioned between not being actively paired and being actively paired.

The system is further configured to control the behavior of an instance based on whether the instance is or is not actively paired during an associated period of time.

In the particular example shown in FIGS. 1A and 1B, the first user 120 is interacting with a number of other users in a teleconferencing session. The teleconferencing session involves the capture and transmission of a video media stream and an audio media stream for distribution to other participants and the receipt and presentation of video media streams and audio media streams for the other participants. The teleconferencing session may offer additional capabilities through teleconferencing sessions such as, but not limited to, casting of display and/or application content to and/or from other participants.

FIGS. 1A and 1B illustrate a first example of a system performing unified UI interactions for user activity across multiple instances included in an actively paired set, in which use of a UI control presented by the first instance 131 results in an instance executing on the second device 132 joining as an endpoint of a teleconferencing session. The first instance 131 is configured to interact with a teleconferencing service, such as to access session records and participate in teleconferencing sessions. For example, the first instance 131 may incorporate various features of the Microsoft Teams™ software for the Microsoft Windows™ 10 operating system. The second instance 133 is configured to interact with the teleconferencing service. In this example, the second instance 133 is configured to provide a "home screen" interface for the second device 132.

In FIG. 1A, a first UI 112 is rendered on a first display 134 (included in the first device 130) by the first instance 133 and is displaying an agenda of scheduled teleconferencing sessions for the first user 120. The first UI 112 includes a scheduled teleconferencing session UI element 114. The UI element 114 includes a first session join UI control 116 (labeled "JOIN") which may be used to join the first user 120 as a participant in an ongoing teleconferencing session, in which four other participants have already joined. Additionally, a second UI 126 is rendered on a second display 136 (included in the second device 132) by the second instance 133 to provide the "home screen" interface. In this particular example, the second UI 322 includes a second session join UI control 128 (labeled "Join") which may also be used to join the first user 120 as a participant in the teleconferencing session.

FIG. 1B illustrates a result of the first user 120 having actuated the first session join UI control 116 by use of a pointer 118 shown in FIG. 1A. The system is configured to process the actuation of the first session join UI control 116 based on at least whether the first device 130 is included in an actively paired set. In response to the first device 130 being included in an actively paired set, the system has, for example via the second instance 133, caused a fourth instance 137 executing on the second device 132 to operate as an audiovisual endpoint for the first user 120 to participate in the teleconferencing session. In some examples, the fourth instance 137 is configured to utilize the second instance 133 to transmit messages via the client connection service 106.

The fourth instance 137 is also configured to receive and render incoming real-time media for the teleconferencing session, render real-time video included in the incoming real-time media in respective regions of a third UI 140 on the second display 136, and render real-time audio included in the incoming real-time media via a loudspeaker included in the second device 132. Thus, although the first session join UI control 116 presented on the first device 130 was used to initiate joining the first user 120 to the teleconferencing session, visual and audio rendering of remote participants and video and audio capture of the first user 120 are performed by the second device 132 based on the first and second instances 131 and 133 being actively paired. Additionally, the third UI 140 includes first session UI controls 142 that include, for example, controls that toggle transmission of video of the first user 120, toggle transmission of audio of the first user 120, adjust the volume for audio rendering to the first user 120, and/or ending participation of the first user 120 in the teleconferencing session. Thus, the second device 132 may operate as a center of focus for the teleconferencing session while leaving the first device 130 free for other activities, including activities not related to the teleconferencing session.

As an example, in response to the actuation of the first session join UI control 116 and determining that the first instance 131 and the second instance 133 are actively paired, the first instance 131 may transmit a first message 102 to the second instance 133 via the client connection service 106, with the first message 102 reflecting the actuation of the first session join UI control 116. Then, in response to determining that the first instance 131 and the second instance 133 are actively paired and receiving the first message 102, the second instance 133 causes the second device 132, using the fourth instance 137, to operate as the audiovisual endpoint. Similarly, actuation of a control included in the first session UI controls 142 may result in the fourth instance 137 (for example, via the second instance 133) sending a message 105 to the first instance 131 via the client connection service 106. It is understood that other approaches involving messages exchanged between and determinations by the first device 130 and the second device 132 may be applied to the same effect.

It is noted that the first device 130 and the second device 132 are each configured to operate as an audiovisual endpoint when unpaired. Accordingly, based on a determination by the first instance 131 that the first instance 131 is not actively paired, the actuation of the first session join UI control 116 would instead result in the first device 130 operating as the audiovisual endpoint for the teleconferencing session, much as shown for the second device 132 in FIG. 1B. Likewise, based on a determination by the second instance 133 that the second instance 133 is not actively paired, the actuation of the second session join UI control 128 would result in the second device 132 operating as the audiovisual endpoint for the teleconferencing session.

Additionally, in FIG. 1B, while maintaining the second device 132 as a primary audiovisual endpoint for the teleconferencing session, a casting portion of the teleconferencing session initiated by a remote participant is presented via the first device 130. The casting portion may include, for example, "screencasting" a portion of a remote participant's display, although other casting techniques may be used. Various approaches involving messages 103 and 105 exchanged between and determinations by the first instance 131 and the second instance 133 and/or fourth instance 137 may be used. For example, the fourth instance 137 may be initially notified of the casting portion and negotiate with the first instance 131, using messages 103 and 105 sent via the client connection service 106, presenting the casting portion on the first device 130.

In this example, a third instance 135 is configured to receive and respond to (for example, by rendering visual casting content 154 on the first display 134 for the casting portion. The fifth software program instance 310 (although a different software program instance may be used) is configured to present a fourth UI 150 including a content display region 152 in which visual casting content 154 included in casting data is rendered.

Additionally, in some implementations the third instance 135 is configured to also present second session UI controls 160 on the first display 134 much as described for the first session UI controls 142. The second session UI controls 160 may include, for example, a control 171 that toggles transmission of video of the first user 120, a control 172 that toggles transmission of audio of the first user 120, and/or a control for ending participation of the first user 120 in the teleconferencing session. In response to actuation of any of the controls 171, 172, and 173, a corresponding message 103 reflecting the control actuation is sent by the first device 130 via the client connection service 106 to the second device 132, resulting in a corresponding action performed by the fourth instance 137. Thus, with communication via the client connection service 106, the user 120 can readily submit commands controlling the teleconferencing session via the first device 130 in addition to the second device 132. This enabled improved, more dynamic, and more flexible user experiences for the first user 120.

Figure 2:
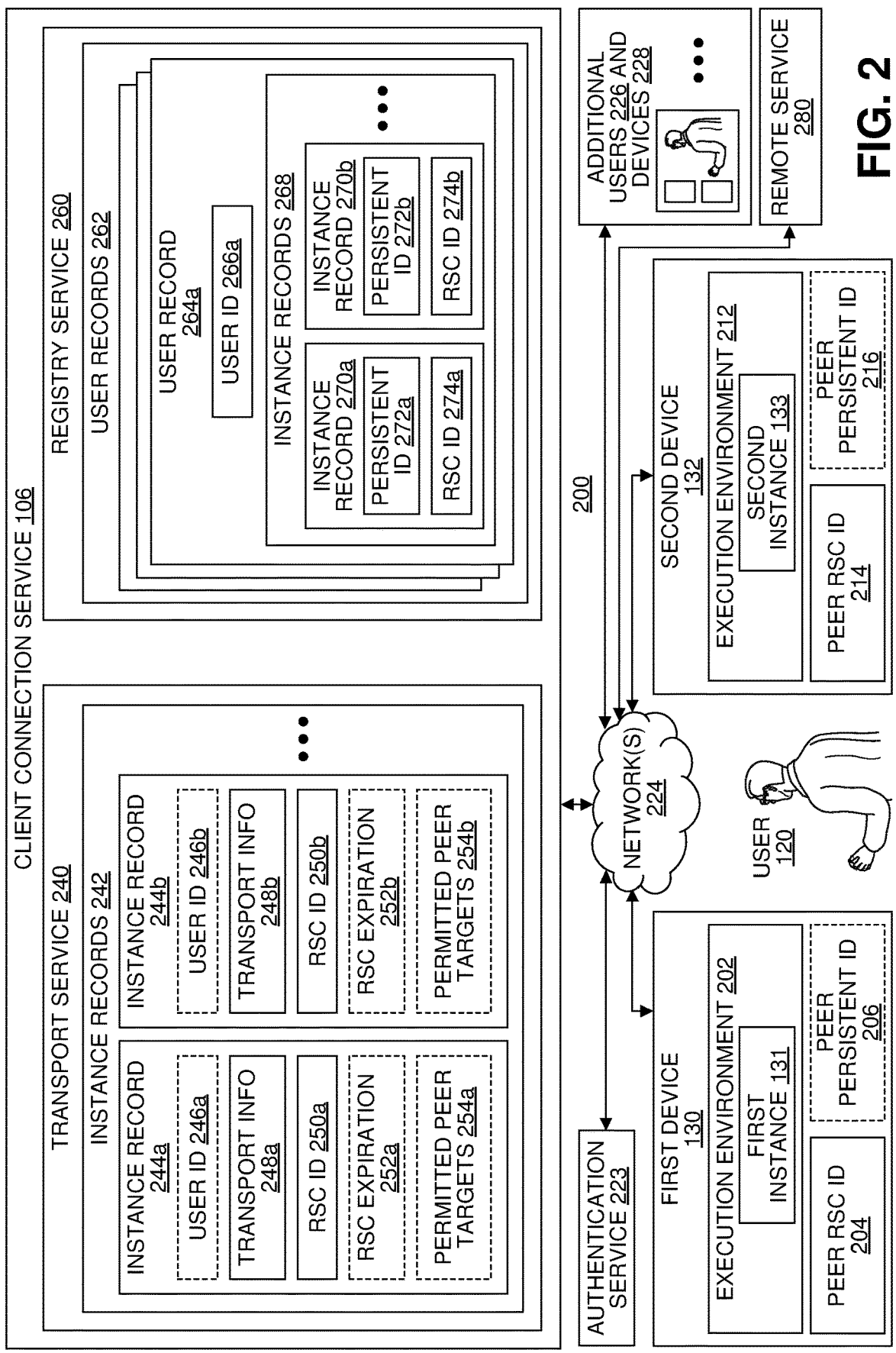
FIG. 2 illustrates an example of a system for establishing secure and resilient persistent network connections for communication.

FIG. 2 illustrates an example of a system 200 for establishing secure and resilient persistent network connections for communication. In the example shown in FIG. 2, the system 200 may associate both the first device 202 and the second device 132 with the first user 120. For example, the first user 120 may have performed a sign-on procedure on the first device 130 and/or the second device 132, such as with an authentication service 223 (which in some implementations may be included in the service 200). The authentication service 223 may be referred to as an "identity provider" or an "identity service." In some examples, as shown in FIG. 2, the system 200 supports multiple users and associated devices, including additional users 226 and associated additional devices 228, including supporting connections and communication between the first device 130, second device 132, and/or various additional devices 228. The first device 130, second device 132, additional devices 228, authentication service 223, and the client connection service 106 are each configured to communicate with other portions of the system 200 via one or more data communication network(s) 224, including the network(s) 108 in FIGS. 1A and 1B.

The authentication service 223 is configured to identify and authenticate user accounts associated with user computing devices. For example, the authentication service 223 may be configured to receive and process credentials in the form of a username and password hash. In some implementations, the authentication service 223 supports the use of credentials obtained from external authentication services (for example, tokens issued by a single sign on (SSO) service), and may associate user identifiers provided by such services with their respective user accounts. In some implementations, the authentication service 223 is configured to issue an access token to a device that has successfully authenticated, and the service 200 is configured to receive and process the access token in later communications with the device for authentication and/or authorization operations. In some implementations, the authentication service 223 is configured to receive and respond to requests to verify that an access token remains valid or unexpired. In some implementations, the authentication service 223 is configured to receive and process requests to "refresh" or "extend" an access token, whereby an expiration time for the access token is extended.

The first device 130 includes a first execution environment 202 in which the first software program instance 131 is executed by the first device 130. Other software program instances may be executed by the first device 130 within the first execution environment 202 and/or other execution environments provided by the first device 130. Similarly, the second device 132 includes a second execution environment 212 in which the second software program instance 133 is executed by the second device 132. As will be described in greater detail in connection with later figures, the first instance 131 maintains, for each peer instance of the first instance 131, a respective first peer resource identifier 204 (labeled "PEER RSC ID") and a respective first peer persistent identifier 206 (labeled "PEER PERSISTENT ID"). Similarly, the second instance 133 maintains, for each peer instance of the second instance 133, a respective second peer resource identifier 214 and a respective second peer persistent identifier 216.

The client connection service 106 includes a transport service 240 and a registry service 260. The transport service 240 is configured to provide network accessible resources for exchanging messages between software program instances, such as between two peer instances. To receive forwarded messages via the transport service 240, an instance binds itself to the transport service 240. The transport service 240 is configured to maintain instance records 242 for the bound instances, with a respective instance record 244 for each bound instance. FIG. 2 illustrates a first instance record 244a for the first instance 131 and a second instance record 244b for the second instance 133. As will be described in greater detail in connection with later figures, the first instance record 244a may include a first user identifier 246a (labeled "USER ID") for a user associated with the first instance 131, first transport channel information 248a (labeled "TRANSPORT INFO") including information used by the transport service 240 to establish and/or maintain a network connection used to exchange messages with the bound instance, a first resource identifier 250a (labeled "RSC ID") identifying a resource assigned to the bound instance, a first resource expiration 252a (labeled "RSC EXPIRATION") indicating a lifetime for the resource identifier, and/or first permitted peer targets 254a identifying targets that the transport service 240 will forward to the bound instance. Likewise, the second instance record 244b includes a second user identifier 246b, second transport channel information 248b, a second resource identifier 250b, a second first resource expiration 252b, and/or second permitted peer targets 254b. For purposes of discussion, the first and second user identifiers 246a and 246b are the same.

The client connection service 106 may further include a registry service 260 configured to maintain a registry of instances bound to the transport service 240. The registry service 260 is configured to update the registry according to update requests received from instances bound to the client connection service 106. Additionally, the registry service 260 is configured to perform queries received from instances; for example, an instance may issue a query to identify instances associated with a particular user identifier. In the example shown in FIG. 2, the registry information is maintained as user records 262, although it is understood that the registry information may be arranged in other ways. In this example, the user records 262 includes a first user record 264a associated with a third user identifier 266a (which, in this example, is the same as the first and second user identifiers 246a and 246b). Additionally, the first user record 264a includes instance records 268 for the bound instances associated with the third user identifier 266a. In this example, the instance records 268 includes a fifth instance record 270a for the first instance 131 and a sixth instance record 270b for the second instance 133. The fifth instance record 270a may include a first persistent identifier 272a associated with the first instance 131, and may include a first resource identifier 274a associated with the first instance 131. The sixth instance record 270b may include a second persistent identifier 272b associated with the second instance 133, and may include a second resource identifier 274b associated with the first instance 133. Each of the instance records 268 has a different persistent identifier 272, allowing instances to be identified despite changes to their respective resource identifiers 274 that may occur over time.

Figure 3:
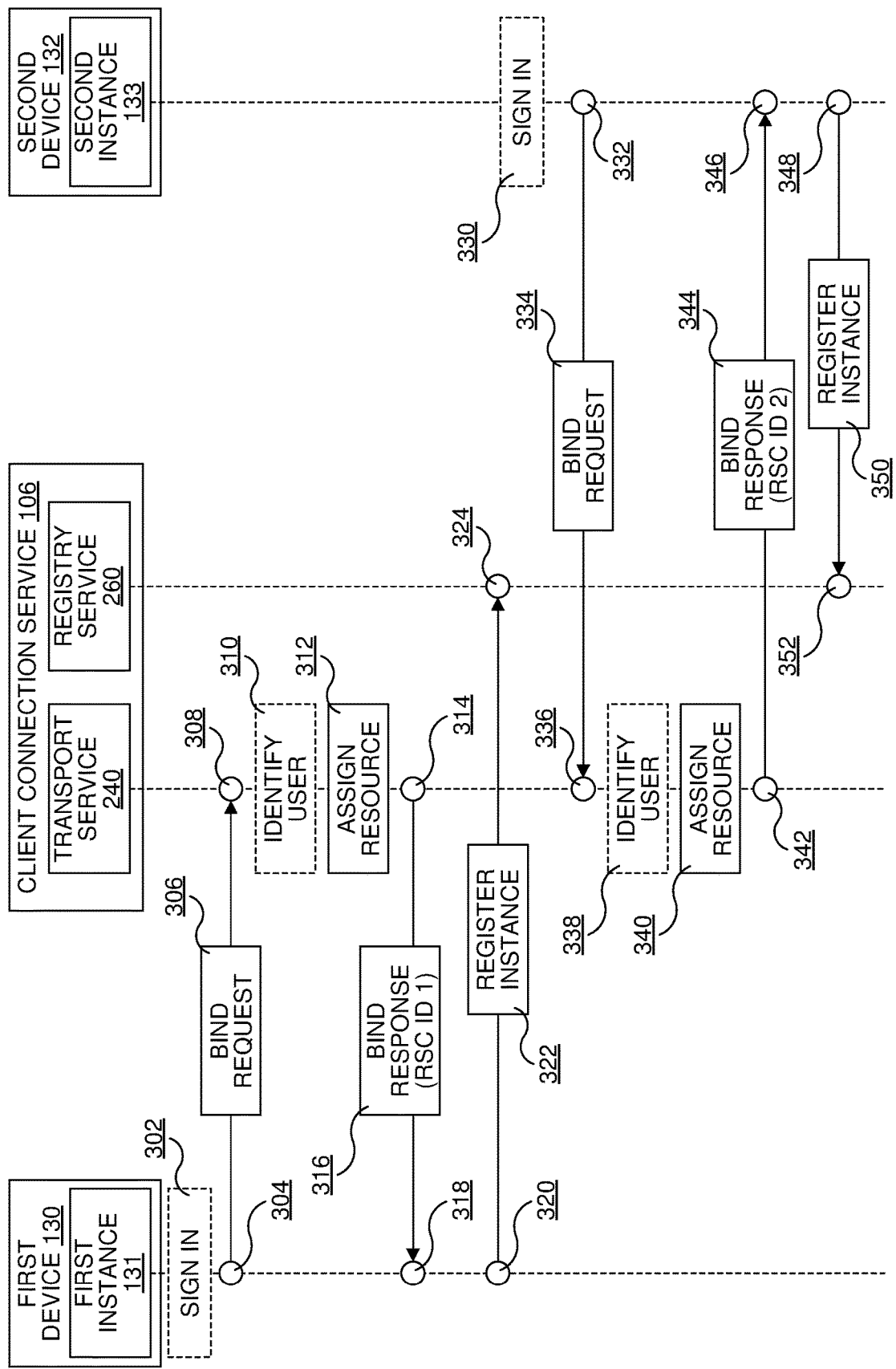
FIG. 3 illustrates an example in which the first instance and the second instance shown in FIGS. 1A, 1B, and 2 are each bound to and registered with the client connection service.

FIG. 3 illustrates an example in which the first instance 131 and the second instance 133 are each bound to and registered with the client connection service 106. In some examples, an operation 302 occurs in which the first user 120 signs into the authentication service 223 via the first instance 131 or the first device 130. In some examples, the operation 302 includes receiving a token issued by the authentication service 223. At an operation 304, the first instance 131 transmits a bind request message 306 to the transport service 240. A "request message" may be more simply referred to as a "request." In some examples, the operation 302 includes determining connection information for the first instance 131 and the bind request 306 includes the connection information. In some examples, the first instance 131 may be configured to operate as a web server responsive to HTML requests, or another server type, with the connection information including a network address, port number, and/or secret value (such as, but not limited to, a header or cookie value to be included in request messages) for communicating with the server. In some examples, the first instance 131 is configured to determine it is operating behind a firewall or is otherwise unable to operate as a server for receiving requests from the client connection service 106, and in response to this determination use a polling mechanism (such as, but not limited to, long polling) to receive requests from the client connection service 106, with the connection information reflecting use of a polling-based connection scheme by the first instance 131. In some examples, the bind request 306 includes user information, such as a user identifier and/or a token issued by the authentication service 223.

At operation 308, the transport service 240 receives and processes the bind request 306. In some implementations, the operation 308 includes verifying that the first instance 131 is currently authenticated with the authentication service 223. For example, this verification may be performed based on an access token provided by the first instance 131 (for example, based on an expiration time indicated by a cryptographically signed access token) and/or by requesting verification by the authentication service 223. The transport service 240 creates the instance record 244a associated with the first instance 131, if it does not already exist. In some implementations, the transport service 240 is configured to remove an instance record from the instance records 242 in response to an unbinding operation performed by an instance. In some examples, a device supporting use by multiple different users provides a "sign out" mechanism, in response to which an instance on the device unbinds itself from the transport service 240. The first transport channel information 248a is set; for example, according to connection information included in the bind request 306. If multiple different connection schemes are available (for example, webhook versus polling), the first transport channel information 248a may include a connection type. For a webhook-based scheme, the first transport channel information 248a may include a URI or associated information. In an example in which the bind request 306 includes connection information, the first transport channel information 248a may be determined based on the connection information included in the bind request 306.

The processing performed in operation 308 may include an operation 310 in which the transport service 240 obtains a user identifier (such as, but not limited to, a username or a numeric or alphanumeric value) associated with the first instance 131 that issued the bind request 306. For example, a user identifier may be obtained based on user information included in the bind request 306. In some implementations, the transport service 240 is configured to interact with the authentication service 223 to obtain a user identifier associated with a token included in the bind request 306. The obtained user identifier may be included in the first instance record 244a as the first user identifier 246a.

In response to receiving the bind request 306, at operation 312 the transport service 240 assigns a resource, provided by a host included in the transport service 240, to the first instance 131. In some implementations, the assigned resource has a corresponding resource identifier in a form of a base URI (by way of example, "https://246-transport-a.trouter.io:443/v2/f/6KMkABF") including a scheme (for example, HTTP or HTTPS), an authority (for example, a hostname or network address and/or a port number), and/or a base path. In some implementations, the client connection service 106 is implemented across multiple data centers, and an authority included in the base URI corresponds to a particular one of the multiple data centers. In some implementations, the assigned resource has a corresponding resource identifier in a form of a value (by way of example, the string "6KMkABF") to be included in requests (for example, as a portion of a URI to which a request is directed, a header portion of the request, and/or a body or payload portion of the request). In FIG. 3, the resource identifier for the resource assigned in operation 312 is labeled "RSC ID 1". The resource identifier for the resource assigned to the first instance 131 is included in the first instance record 244a as the first resource identifier 250a. The transport service 240 is configured to, in response to receiving a request corresponding to the first resource identifier 250a, forward the received request to the first instance 131 according to the first transport channel information 248a, as will be described in greater detail in connection with later figures. Additionally, at operation 314 the transport service 240 transmits a bind response message 316 to the first instance 131 as a response to the bind request 306. A "response message" may be simply referred to as a "response."

In some implementations, the transport service 240 is configured to receive from the first instance 131, via the bind request 306 or an additional request not shown in FIG. 3, permitted peer targets. The transport service 240 is configured to update the first permitted peer targets 254a accordingly, and is configured to determine whether to forward a request directed to a target corresponding to the first resource identifier 250a based on whether the target corresponds to the first permitted peer targets 254a. For example, if the first permitted peer targets 254a includes one or more whitelisted target paths (which may be expressed using regular expressions), the target must match one of the target paths to be forwarded. By use of the first permitted peer targets 254a, the transport service 240 is able to filter requests to prevent abusive or invalid requests from being sent to the first instance 131.

Although FIG. 3 shows a single request 306 and a single response 316, it is understood that other communication schemes may be applied to similar effect. For example, additional messages may be exchanged to negotiate a connection scheme between the first instance 131 and the transport service 240. Similar considerations apply to other request/response exchanges described herein.

At operation 318, the first instance 131 receives the bind response 316 from the transport service 240. At operation 320, the first instance 131 transmits a register instance request 322 to the registry service 260. The register instance request 322 may indicate a user identifier, a persistent identifier, and/or a resource identifier (for example, the resource identifier included in the bind response 316) associated with the first instance 131. At operation 324 the registry service 260 receives the register instance request 322 and, in response, creates and/or updates the first user record 264a and the fifth instance record 270a accordingly. For example, a user identifier included in the register instance request 322 may be used to identify the first user record 264a (if it already exists) and/or be stored as the third user identifier 266a, a persistent identifier included in the register instance request 322 may be used to identify the fifth instance record 270a (if it already exists) and/or be stored as the first persistent identifier 272a, and a resource identifier included in the register instance request 322 stored as the third resource identifier 274a. By querying the registry service 260, other elements of the system 200, such as the second instance 133, are able to obtain the resource identifier 274a associated with the first instance 131, as will be discussed in connection with FIG. 4.

FIG. 3 shows a similar set of operations 330, 336, 338, 340, 342, 346, 348, and 352 performed by the system 200 in connection with binding the second instance 133 with the client connection service 106. In some examples, an operation 330 occurs in which the first user 120 signs into the authentication service 223 via the second instance 133 or the second device 130, much as described for operation 302. At operation 332, the second instance 133 transmits a bind request 334 to the transport service 240, and at operation 336 the transport service 240 receives and processes the bind request 334, much as described for bind request 306 and operations 304 and 308. The processing performed in operation 336 may include an operation 338 in which the transport service 240 obtains a user identifier associated with the second instance 133, much as described for operation 310. At operation 340, the transport service 240 assigns a resource to the second instance 133, much as described for operation 312. In FIG. 3, a resource identifier for the resource assigned to the second instance 133 in operation 340 is labeled "RSC ID 2". At operation 342, the transport service 240 transmits a bind response 344 to the second instance 133, and at operation 346 the second instance 133 receives and processes the bind response 344, much as described for bind response 316 and operations 314 and 318. At operation 348, the second instance 133 transmits a register instance request 350 to the transport service 240, and at operation 352 the transport service 240 receives and processes the register instance request 350, much as described for register instance request 322 and operations 320 and 324.

Figure 4:
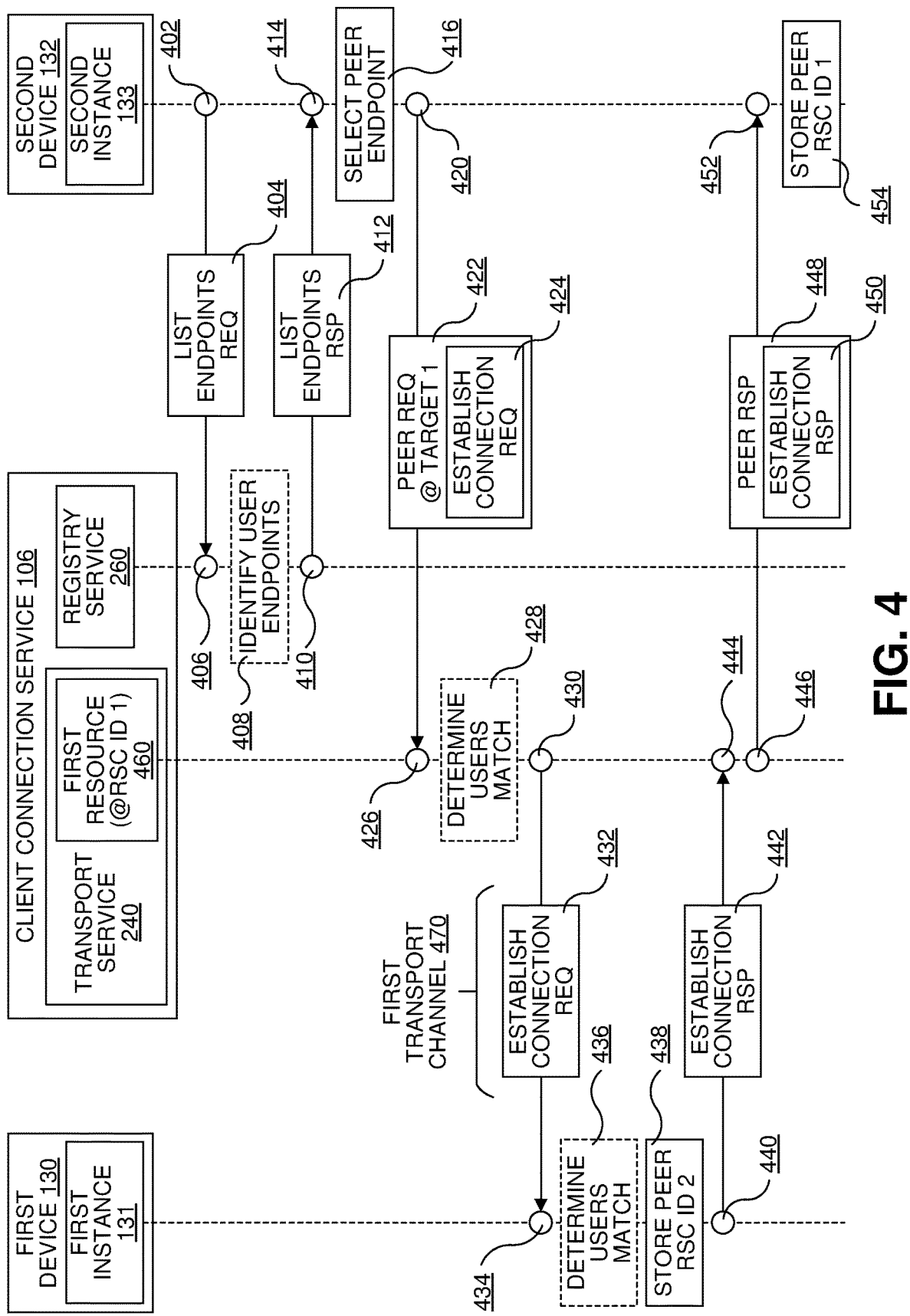
FIG. 4 illustrates an example of a pairing procedure between the first instance and the second instance performed via the client connection service and initiated by the second instance.

Continuing from the example in FIG. 3, FIG. 4 illustrates an example of a pairing procedure between the first instance 131 and the second instance 133 performed via the client connection service 106 and initiated by the second instance 133. In an operation 402, to query the registry service 260 to identify other instances available for pairing with the second instance 133, the second instance 133 transmits a first list endpoints request 404 (labeled "LIST ENDPOINTS REQ") to the registry service 260. At operation 406, the registry service 260 receives and processes the first list endpoints request 404 to identify appropriate instances from the registry.

In some implementations, the operation 406 includes an operation 408 in which the identified endpoints are limited to the instances currently bound to the client connection service 106 and associated with a same user identifier associated with the requesting second device 212. For example, the user identifier associated with the second instance 133 may be identified based on a token provided by the second instance 133, such as a token included in the first list endpoints request 404, or may be explicitly included in the first list endpoints request 404. Based on the identified user identifier, the registry service 260 identifies the first user record 264a. The registry service 260 identifies the instances associated with the user identifier 268 from the instance records 268 included in the first user record 264a. In some implementations, other approaches may be used to identify responsive instance records.

At operation 410, the registry service 260 transmits a first list endpoints response 412 to the second instance 133 as a response to the first list endpoints request 404. The first list endpoints response 412 includes information obtained from the instance records identified in operation 406. For example, the first list endpoints response 412 may include, for each identified instance record, a persistent identifier and a resource identifier. In the example shown in FIG. 4, the first list endpoints response 412 includes the first persistent identifier 272a and the third resource identifier 274a for the first instance 131, and may also include information for other instances as well. At operation 414, the second instance 133 receives and processes the first list endpoints response 412. The operation 414 includes operation 416, in which the second instance 133 selects a peer endpoint from one or more instances identified in the first list endpoints response 412. In some implementations, the second instance 133 presents a list of instances to the first user 120 and receives user input selecting the desired instance for pairing with the second instance 133. In this particular example, the first instance 131 has been selected for pairing.

At operation 420, the second instance 420 is configured to identify a first target resource (labeled "TARGET 1" in FIG. 4) based on the resource identifier 274a included in the first list endpoints response 412 for the first instance 131. A first peer request 422 (labeled "PEER REQ" in FIG. 4), which includes a first establish connection request 424 (labeled "ESTABLISH CONNECTION REQ") for forwarding to the first instance 131, is sent to the first target resource. The first target resource corresponds to the resource assigned to the first instance 131 in operation 312, which will be designated the first resource 460, as shown in FIG. 4. In some examples, the resource identifier is a base URI and the first target resource is identified by appending a further path component. For example, from a resource identifier with a base URI of "https://246-transport-a.trouter.io:443/v2/f/6KMk-ABF", for an establish connection request a further path of "/connect-peer" may be added, yielding "https://246-transport-a.trouter.io:443/v2/f/6KMkABF/connect-peer" as the first target resource. In an example in which the first peer request 422 is sent as an HTML request, the establish connection request may be included in the body or payload of the HTML request.

At operation 426, the transport service 240 receives and processes the first peer request 422. The transport service 240 determines that the first peer request 422 was sent to the first resource 460; for example, by determining that the first target resource to which the first peer request 422 was sent corresponds to the first resource 460. Based on this determination, the transport service 240 selects the first instance record 244a associated with the first instance 131; for example, based on a determination that the first target resource corresponds to the first resource identifier 250a included in the first instance record 244a.

In some implementations, the transport service 240 is configured to limit forwarding to between instances associated with a same user identifier, and operation 426 includes operation 428 in which the transport service 240 determines whether the first and second instances 131 and 133 are associated with the same user identifier. In response to a determination that the associated user identifiers are the same, the transport service 240 continues with its processing of the first peer request 422 as shown in FIG. 4. In response to a determination that the associated user identifiers are different, the transport service 240 does not proceed with forwarding the first establish connection request 424 to the first instance 131.

At operation 430, the transport service 240 establishes and/or uses an established first transport channel 470 between the transport service 240 and the first instance 131 based on the first transport channel information 248a included in the first instance record 244a. The first transport channel 470 is used to transmit a first forwarded establish connection request 432 to the first instance 131. Although multiple network connections may be established and terminated between the transport service 240 and the first instance 131 over time, those connections are all considered part of a single first transport channel 470 used by the transport service 240 to "push" forwarded requests received from other instances to the first instance 131 and receive corresponding responses from the first instance 131. In an example in which the first peer request is directed to a path (for example, where the first peer request 422 is an HTML request sent to a URI specifying a path) and the first forwarded establish connection request 432 is sent to a URI (for example, where the first instance 131 operates as a server to receive the first forwarded establish connection request 432 as an HTML request), the URI may be identified based on a portion of the path. In an example, the transport service 240 is configured to obtain a "/connect-peer" portion from a "/v2/f/6KMkABF/connect-peer" URI for the first peer request 422 (for example, based on first resource identifier 250a), and combine the obtained portion with a webhook base URI (for example, included in first transport channel information 248a) "https://1.2.3.4" to obtain a URI "https://1.2.3.4/connect-peer" to which the first forwarded establish connection request 432 is sent.

At operation 434, the first instance 131 receives and processes the first forwarded establish connection request 432. In some implementations, the operation 434 includes operation 436, in which the transport service 240 determines whether the first and second instances 131 and 133 are associated with the same user identifier. For example, the first forwarded establish connection request 432 may include a token issued by the authentication service 223. The first forwarded establish connection request 432 includes the second resource identifier associated with the second instance 133, and at operation 438 the first instance 131 retains the second resource identifier as the first peer resource identifier 204 to permit the first instance 131 to later forward requests to the second instance 133 via the transport service 240. In some examples, the first forwarded establish connection request 432 includes the persistent identifier associated with the second instance 133, and at operation 438 the first instance 131 retains the persistent identifier as the first peer persistent identifier 206 for later use by the first instance 131. Similarly, at operation 454 the second instance 133 retains the resource identifier included in the first list endpoints response 412 for the first instance 131 as the second peer resource identifier 214, and in some examples at operation 454 the second instance 133 retains a persistent identifier included in the first list endpoints response 412 for the first instance 131 as the second peer persistent identifier 216.

At operation 440, the first instance 131 transmits a first establish connection response 442 via the first transport channel 470 as a response to the first forwarded establish connection request 432. The first establish connection response 442 may simply acknowledge a successful connection of the second instance 133 with the first instance 131. At operation 444, the transport service 240 receives and processes the first establish connection response 442. In response to receiving the first establish connection response 442, at operation 446 the transport service 240 transmits a first peer response 448 to the second instance 133 as a response to the first peer request 422. The transport service 240 forwards the first establish connection response 442 to the second instance 133 as a second establish connection response 450 included in the first peer response 448. Accordingly, the second instance 133 receives an acknowledgement of the pairing of the first and second instances 131 and 133.

Figure 5:
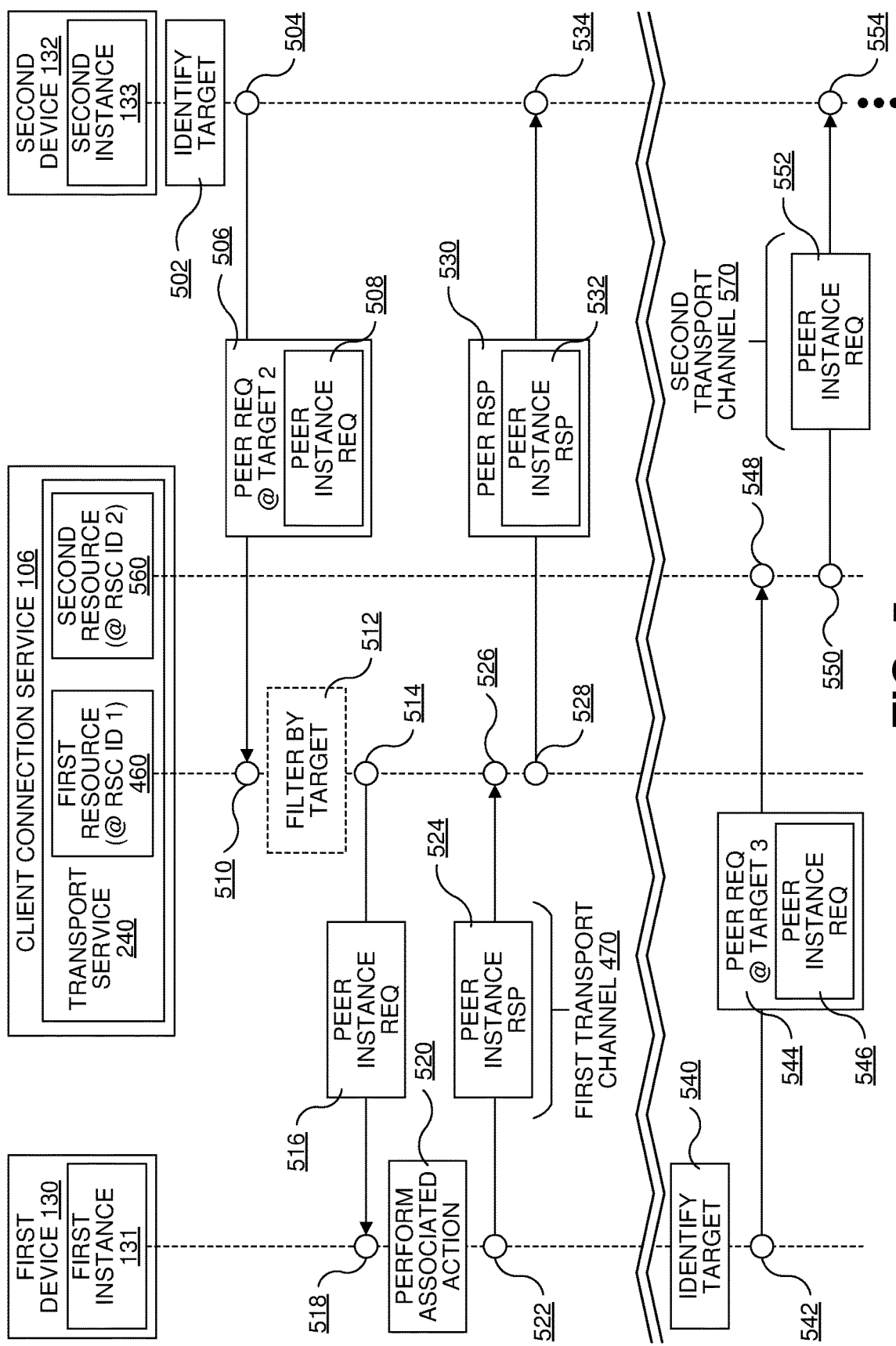
FIG. 5 illustrates examples of the client connection service being used to forward requests and corresponding responses between the first instance and the second instance that were paired in FIG. 4.

Continuing from FIG. 4, FIG. 5 illustrates examples of the client connection service 106 being used to forward requests and corresponding responses between the first instance 131 and the second instance 133 that were paired in FIG. 4. It is noted that such forwarding by the client connection service 106 is not limited to request messages; for example, a simplex notification message, without a corresponding response message, may be forwarded to an instance by the client connection service 106. At operation 502, a first peer instance request 508 is to be forwarded from the second instance 133 to the first instance 131, and the second instance 133 identifies a second target resource (labeled "TARGET 2") to which a second peer request 506, which includes the first peer instance request 508, is to be sent, much as described for operation 420 in FIG. 4. At operation 504, the second peer request 506 is sent to the second target resource (which corresponds to the first resource 460 associated with the first instance 131), much as described for operation 420 in FIG. 4.

At operation 510, the transport service 240 receives and processes the second peer request 506. In some implementations, the transport service 240 confirms that the first instance 131 and the second instance 133 are associated with the same user identifier, much as described for operation 428 in FIG. 4. In some examples, the operation 510 includes operation 512 in which the transport service 240 filters incoming requests by their respective target resources based on the first permitted peer targets 254a associated with the first instance 131, much as previously discussed in FIG. 3. The filtering described for operation 512 may also be performed as part of the operation 426 in FIG. 4.

At operation 514, the transport service 240 establishes and/or uses the first transport channel 470 between the transport service 240 and the first instance 131 to transmit a first forwarded peer instance request 516 to the first instance 131, much as described for the operation 430 and the first forwarded establish connection request 432 in FIG. 4. The first forwarded peer instance request 516 is generated based on the first peer instance request 508 included in the second peer request 506. In some implementations, the second peer request 506 is an HTML, request and the first peer instance request 508 and the first forwarded peer instance request 516 both include a respective JSON or XML formatted payload portion. In some examples, the payload portions of the first peer instance request 508 and the first forwarded peer instance request 516 are identical.

At operation 518, the first instance 131 receives and processes the first forwarded peer instance request 516 and, at an operation 520 included in the operation 518, performs an action associated the first forwarded peer instance request 516 in response to the receipt of the first forwarded peer instance request 516. For example, where the forwarded peer instance request 516 is an establish connection request, as shown in FIG. 4, the actions described in connection with operation 434 are performed.

At operation 522, the first instance 131 transmits a first peer instance response 524 via the first transport channel 470 as a response to the first forwarded peer instance request 516. In some examples, responses for multiple forwarded peer instance requests may be aggregated in a single peer instance response transmitted by the first instance 131, to reduce a number of messages being exchanged; for example, this may be more efficient where the responses are simple acknowledgements. In some examples, depending on the action associated with the first forwarded peer instance request 516, the first peer instance response 524 may include a significant amount of data for transfer to the second instance 133. At operation 526, the transport service 240 receives and processes the first peer instance response 524. In response to receiving the first peer instance response 524, at operation 528 the transport service 240 transmits a second peer response 530 to the second instance 133 as a response to the second peer request 506. The transport service 240 forwards the first peer instance response 524 to the second instance 133 as a second peer instance response 532 included in the second peer response 530. In some examples, multiple peer instance responses (for example, including the first peer instance response 524) may be aggregated in a single peer response transmitted by the transport service 240, to reduce a number of messages being exchanged.

Additionally, the first instance 131 may send requests to, and receive responses from, the second instance 133 with which it was paired in FIG. 4. As discussed in connection with operation 438, in the pairing procedure performed in FIG. 4, the first instance 131 received the first peer resource identifier 204 for a second resource 560 assigned by the transport service 240 to the second instance 133 in operation 340. At operation 540, a second peer instance request 546 is to be forwarded from the first instance 131 to the second instance 133, and the first instance 131 identifies a third target resource (labeled "TARGET 3") to which a third peer request 544, which includes the second peer instance request 546, is to be sent, much as described for operation 504. At operation 542, the third peer request 544 is sent to the third target resource (which corresponds to the second resource 560 assigned to the second instance 133), much as described for operation 504.

At operation 548, the transport service 240 receives and processes the third peer request 544. In operation 548, and much as described for operation 428 in FIG. 4 and operation 512, the transport service 240 may be configured to confirm that the first instance 131 and the second instance 133 are associated with a same user identifier and/or may be configured to filter received peer requests by target resource based on the second permitted peer targets 254b included in the second instance record 244b for the second instance 133.

At operation 550, much as described for operation 430 in FIG. 4 and operation 514, the transport service 240 establishes and/or uses an established second transport channel 570 between the transport service 240 and the second instance 133 based on the second transport channel information 248b included in the second instance record 244b. The second transport channel 570 is used to transmit a second forwarded peer instance request 552 to the second instance 133, much as described for the operation 514 and the first forwarded peer instance request 516. The second forwarded peer instance request 552 is generated based on the first peer instance request 508 included in the second peer request 506. In some implementations, the third peer request 544 is an HTML request and the second peer instance request 546 and the second forwarded peer instance request 552 both include a respective JSON or XML formatted payload portion. In some examples, the payload portions of the second peer instance request 546 and the second forwarded peer instance request 552 are identical. At operation 554, the second instance 133 receives and processes the second forwarded peer instance request 552, and operations are performed by the second instance 133, the transport service 240, and the first instance 131 that result in the second instance 133 performing an action associated with the second forwarded peer instance request 552 and the first instance 131 receiving a resulting response, much as described for operations 522 through 534.

The described use of the client connection service 106 offers a number of advantages. By making instances not directly available to other systems, but instead providing access to instances via the client connection service 106, the actual network addresses of the instances are not exposed, even to other instances associated with a same user identifier. This serves to protect sensitive information such as locations and/or user identities associated with instances. Additionally, request filtering, as described for operation 512, prevents interfaces that an instance may make available to a service (for example, the client connection service 106 and/or the remote service 280) from being accessed and abused via the client connection service 106. For example, abuse might otherwise occur in the form of malicious requests and/or content. Further, the client connection service 106 allows peering connections between instances to be treated as more robust and persistent connections than would be obtained via direct network connections between the instances. For example, the client connection service 106 can automatically respond to changes in an instance's network connectivity, and will have greater uptime than expected from instances. Also, the client connection service 106 encapsulates different connection schemes that may be used across a population of instances. For example, although some instances may use webhooks to receive requests, and some instances may use long polling, a single communication protocol is available for all of the instances via the client connection service 106. Additionally, the client connection service 106 presents instances via a server interface, which supports use of a service oriented architecture and/or event driven architecture for interacting with instances. This allows common code, libraries, and/or frameworks to be used for interacting with both instances and other services, such as the remote service 280.

In some implementations, the transport service 240 is configured to temporarily (for example, for a predetermined amount of time) buffer peer requests and/or peer responses for instances that are unable to immediately receive messages, such as during a temporary period of disconnection. For example, the transport service 240 may be configured to buffer peer requests and/or peer responses for up to 60 seconds. This provides resilience against temporary disconnections of instances with the transport service 240, which is beneficial for instances on mobile devices that may switch networks and/or experience periods of poor or no network connectivity more frequently than their non-mobile counterparts.

In some implementations, the transport service 240 is configured to maintain a resource assignment for an instance while changing to a different transport channel for conveying messages between the instance and the transport service 240. For example, the first instance 131 may continue to be assigned to the first resource 460 after changing from the first transport channel 470 to a different transport channel. In some examples, the transport channel may be changed in response to a change in network connectivity for the instance; for example, the instance may be executing on a mobile device that that was initially connected via a cellular data network but has established network connectivity via a Wi-Fi network. This permits instances on mobile devices to continue to maintain connections as they change location and networks, and avoid having to renegotiate sessions with peer instances. In some examples, the change to the different transport channel may include a change to a different connection scheme; for example, although long polling may initially be used, a change to a different network without a firewall permits and results in use of a webhook-based connection scheme instead. This permits instances on mobile devices to make use of the best available connection schemes as they move between networks.

Figure 6:
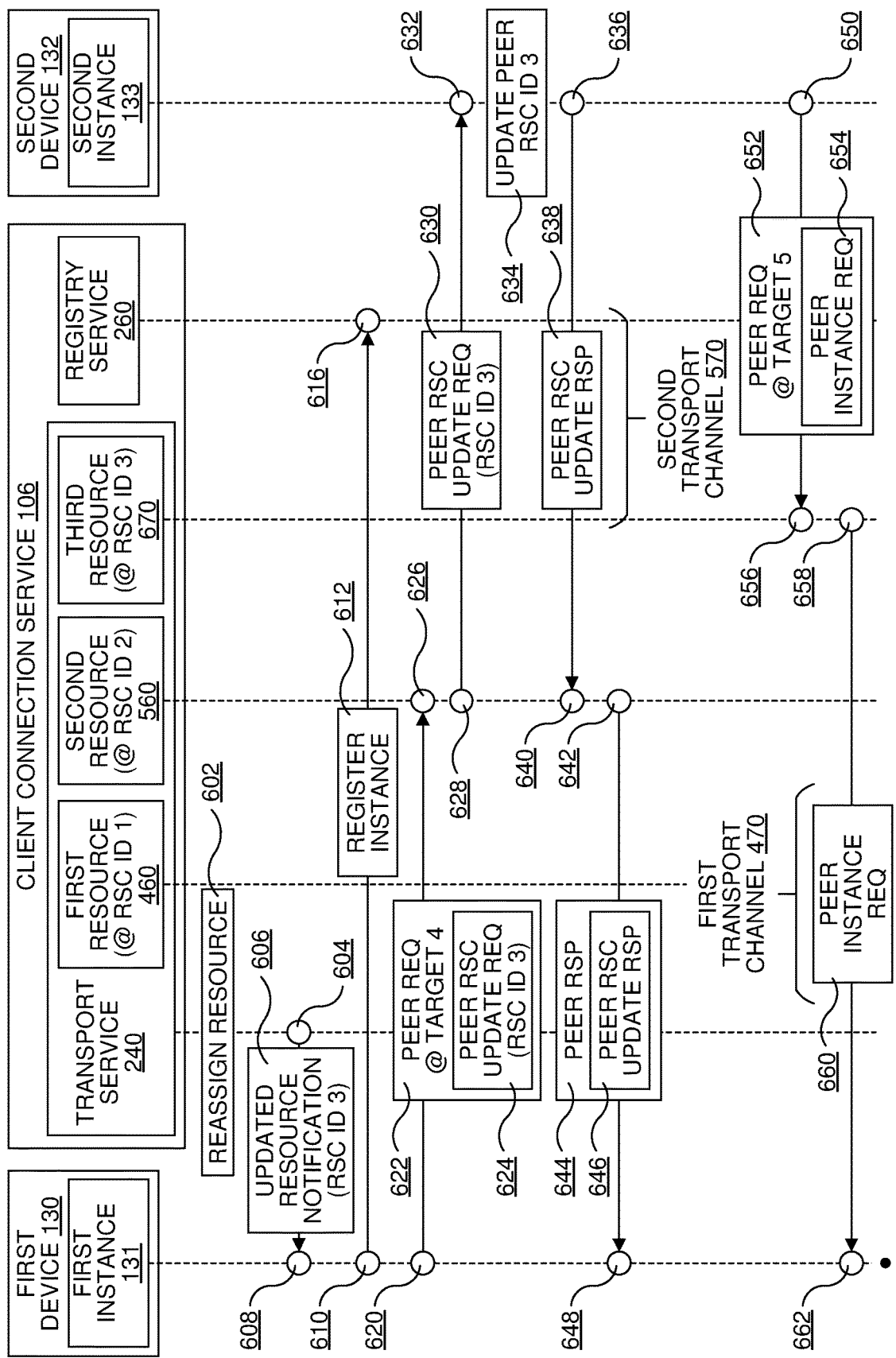
FIG. 6 illustrates an example in which the client connection service reassigns the first instance from a first resource to a different second resource, and the first instance communicates to the second instance the change to the new second resource.

Continuing from FIG. 3, FIG. 6 illustrates an example in which the client connection service 106 reassigns the first instance 131 from the first resource 460 to a different third resource 670, and the first instance 131 communicates to the second instance 133 the change to the third resource 670. As noted in connection with FIG. 2, the first instance record 244*a* may include a resource expiration 252*a* for a resource currently assigned to the first instance 131 (and identified by the resource identifier 250*a*). The transport service 240 is configured to, in response to a current time being equal to or greater than the resource expiration 252*a*, perform an operation 602 in which the first instance 131 is reassigned from the first resource 460 to a different third resource 670. As a result, the first instance 131 is no longer associated with the first resource 460, thereby making the first resource 460 ineffective for forwarding requests to the first instance 131. Also, the resource identifier 250*a* is updated to a resource identifier associated with the third resource 670, and the resource expiration 252*a* is updated to identify a time at which the first instance 131 should again be reassigned to a different resource.

Then, at operation 604, the transport service 240 transmits an updated resource notification 606 to the first instance 131, which provides the first instance 131 with its new resource identifier (labeled "RSC ID 3") associated with the third resource 670. At operation 608, the first instance 131 receives and processes the updated resource notification 606, including updating the second peer resource identifier 214 to the new resource identifier included in the updated resource notification 606. Further in response to receiving the updated resource notification 606, at operation 610 the first instance 131 transmits a transmits a register instance request 612 to the registry service 260 to update the registry, causing the registry service 260 to associate the first instance 131 with the new resource identifier at operation 616, much as previously described in connection with register instance request 322 and operation 324 in FIG. 3.

Also in response to receiving the updated resource notification 606, the first instance 131 provides the updated resource identifier to its peer instances, including the second instance 133. At operation 620, the first device 131 sends a fourth peer request 622 to a fourth target resource (labeled "TARGET 4") corresponding to the second resource 560 assigned by the transport service 240 to the second instance 133. The fourth peer request 622 includes a first peer resource update request 624, indicating that the resource identifier associated with the first instance 131 has changed to the new resource identifier ("RSC ID 3") associated with the third resource 670.

At operation 626, the transport service 240 receives and processes the fourth peer request 622, much as described for operations 510 and 548 in FIG. 5. At operation 628, the transport service 240 establishes and/or uses the second transport channel 570 between the transport service 240 and the second instance 133 to transmit a first forwarded peer resource update request 630 to the second instance 133, much as described for the operations 514 and 550 and the first and second forwarded peer instance requests 516 and 552 in FIG. 5. The first forwarded peer resource update request 630 is generated based on the first peer resource update request 624 included in the fourth peer request 622, and likewise indicates that the resource identifier associated with the first instance 131 has changed to the new resource identifier ("RSC ID 3") associated with the third resource 670.

At operation 632, the second instance 133 receives and processes the first forwarded peer resource update request 630, which includes, at an operation 634, updating the second peer resource identifier 214 stored by the second instance 133 to the new resource identifier ("RSC ID 3") indicated by the first forwarded peer resource update request 630, much as it was previously set at operation 454 in FIG. 4. Much as described for operations 522 through 534, at operation 636 the second instance 133 sends a first peer update resource response 638 to the transport service 240 as a response to the first forwarded peer resource update request 630, at operation 640 the transport service 240 receives and processes the first peer update resource response 638, at operation 642 the transport service 240 sends a third peer response 644 (which includes a second peer update resource response 646 generated from the first peer update resource response 638) to the first instance 131 as a response to the fourth peer request 622, and at operation 648 the first instance 131 receives and processes the third peer response 644.

At a later time, at operation 650, a third peer instance request 654 is to be forwarded from the second instance 133 to the first instance 131. Based on the second peer resource identifier 214 updated in operation 634, the second instance 133 identifies a fifth target resource (labeled "TARGET 5") to which a fifth peer request 652, which includes the third peer instance request 654, is to be sent, much as described for operation 502 in FIG. 5. Then, the fifth peer request 652 is sent to the fifth target resource (which corresponds to the third resource 670 now associated with the first instance 131), much as described for operation 504 in FIG. 5. Thus, by correctly using the new resource identifier to target the first instance 131, the third peer instance request 654 is received, processed, and forwarded via the first transport channel 470 to the first instance 131 as a third forwarded peer instance request 660 in operations 656, 658, and 662, much as previously described for operations 510, 514, and 518 in FIG. 5.

By periodically changing the resource associated with the first instance 131, even if abuse of the first instance 131 is attempted via the first resource 460, after a period of time the first resource 460 will no longer be effective for forwarding messages to the first instance 131, thereby frustrating such abuse. In some implementations, the client connection service 106 is configured to detect attempted abuse of an instance via an assigned resource (for example, by detecting an excessive rate or volume of messages being sent to the resource) and initiate the operation 602 in response to a positive detection of attempted abuse. For example, this may disrupt a denial of service attack being directed at an instance via the client connection service 106. In some implementations, the client connection service 106 is configured to initiate the operation 602 in response to receiving a corresponding request from the first instance 131 and/or the second instance 133. For example, the first instance 131 may be configured to issue such a request in response to detecting attempted abuse or high latency conditions. As another example, the first instance 131 may be configured to issue such a request to "reset" a current peer connection and, in some examples, reset any pending messages held by the client connection service 106 for the current peer connection.

Figure 7:
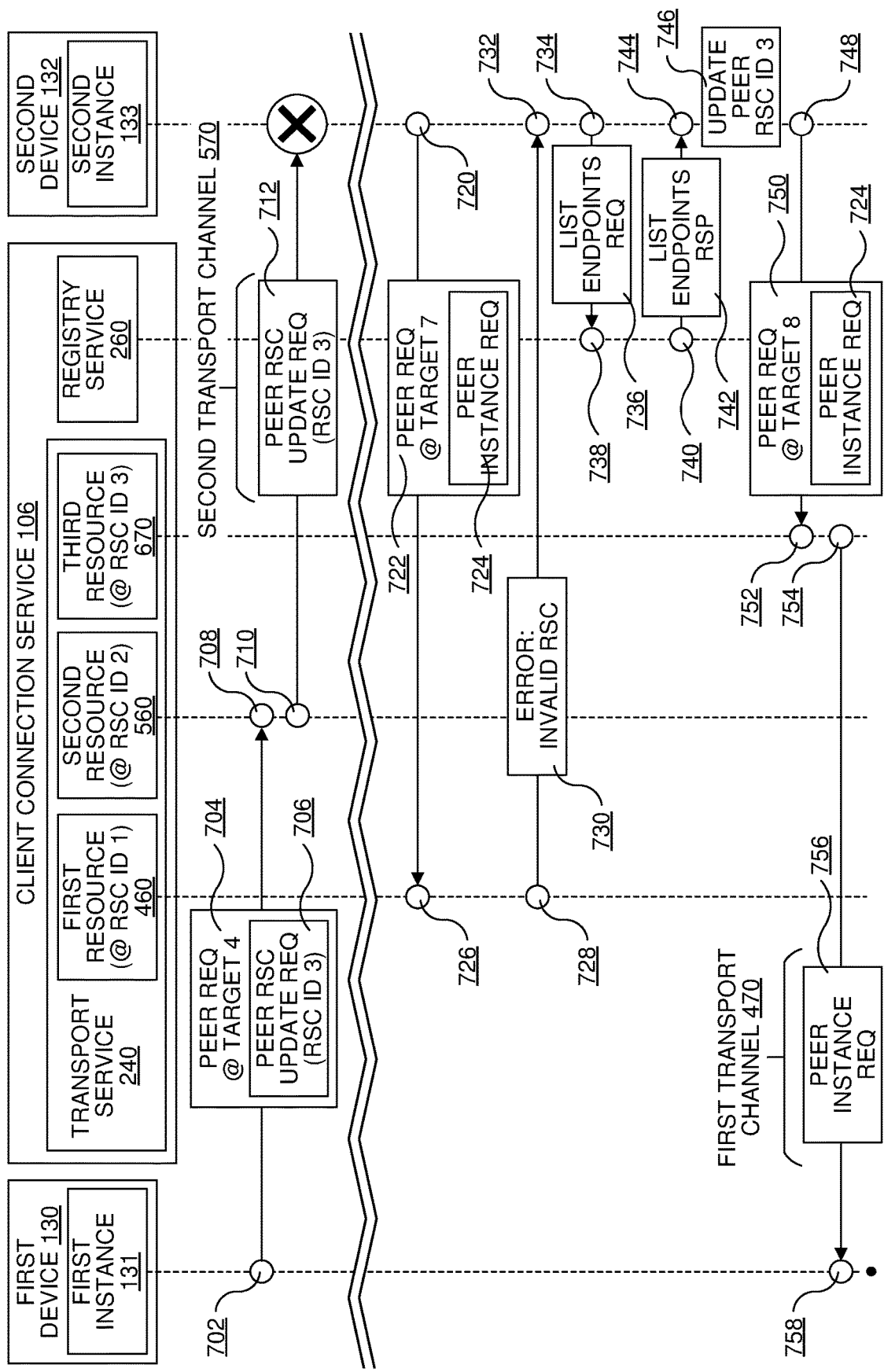
FIG. 7 illustrates an example in which the first instance is unable to convey an updated resource identifier to the second instance in the same manner shown in FIG. 6, and recovery by the second instance from an initial misuse of an outdated resource identifier for communicating with the first instance.

FIG. 7 illustrates an example in which the first instance 131 is unable to convey an updated resource identifier to the second instance 133 in the same manner shown in FIG. 6, and recovery by the second instance 133 from an initial misuse of an outdated resource identifier for communicating with the first instance 131. FIG. 7 continues from after operation 616 in FIG. 6. At operation 702, the first instance 131 attempts to provide the new resource identifier in a second peer resource update request 706 included in a sixth peer request 704, much as described for operation 620 in FIG. 6. Much as described for operation 626 in FIG. 6, at operation 708 the transport service 240 receives and processes the sixth peer request 704. Much as described for operation 628 in FIG. 6, the transport service 240 attempts to send a second peer resource update request 712 via the second transport channel 570 to the second instance 133. However, at that time the transport service 240 is unable to communicate with the second instance 133; for example, the second device 132 on which the second instance 133 is executing may have temporarily lost network connectivity. As a result, the second instance 133 is not notified of the new resource identifier that is to be used for forwarding messages to the first instance 131.

Later, at operation 720, and as in FIG. 5, the second peer resource identifier 214 used by the second instance 133 continues to correspond to the first resource 460. Thus, a seventh peer request 722, which includes a fourth peer instance request 724, is sent to a seventh target (labeled "TARGET 7") that corresponds to the first resource 460 previously assigned to the first instance 131. However, at the time of operation 726, when the seventh peer request 722 is received by the transport service 240, the first resource 460 is no longer associated with an instance. In response to the seventh target resource not corresponding to the first resource 460 or another such resource, at operation 728 the transport service 240 transmits an error message 730, indicating the seventh target resource is invalid, to the second instance 133 as a response to the seventh peer request 722. In some examples, the seventh peer request 722 is an HTML request and the error response 720 is an HTML response with a 4XX client error status code, such as a "404 Not Found" status code.

At operation 732, the second instance 133 receives and processes the error response 730. Based in the receipt of the error message 730 in response to the seventh peer request 722, the second instance 133 determines that the first instance 131 is no longer assigned to the first resource 460. In response to this determination, at operation 734 the second instance 133 sends a second list endpoints request 736 to the registry service 260, with the registry service 260 receiving the second list endpoints request 736 and identifying appropriate instances at operation 738, at operation 740 the registry service sending a second list endpoints response 742, much as described for operations 402 through 410 in FIG. 4. Then at operation 744 the second instance 133 obtains from the list endpoints response 742 the resource identifier associated with the second peer persistent identifier 216 for the first instance 131. Alternatively, the second instance 133 may issue a locate endpoint request (not shown in FIG. 7) that includes the second peer persistent identifier 216, with the registry service 260 identifying a resource identifier associated with the received second peer persistent identifier 216 and returning a locate endpoint response (not shown in FIG. 7) including the identified resource identifier ("RSC ID 3") for the first instance 131 corresponding to the second peer persistent identifier 216. As the persistent identifier 272a stored by the registry service 260 remains the same as the second peer persistent identifier 216 stored by the second instance 133, the persistent identifier is effective for obtaining the new resource identifier ("RSC ID 3") for the first instance 131.

At operation 746, the second instance 133 updates the second peer persistent identifier 216 with the new resource identifier obtained from the registry service 260. At operation 748, based on the new value of the second peer persistent identifier 216, the second instance 133 identifies an eighth target resource (labeled "TARGET 8") to which the second instance 133 sends an eighth peer request 750 including the fourth peer instance request 724, similar to the seventh peer request 722. The eighth target resource corresponds to the third resource 670 currently assigned to the first instance 131. Thus, at operation 752 the transport service 240 receives and processes the eighth peer request 750 and at operation 754 sends a fourth forwarded peer instance request 756 via the first transport channel 470 to the first instance 131, which is successfully received and processed by the first instance 131 at operation 758, much as previously described for operations 510 through 518 in FIG. 5. The first instance 131 may perform an associated action and send a response, much as described for operations 522 through 534 in FIG. 5.

In some implementations, the client connection service 106 is configured to periodically determine whether the first instance 131 and/or the second instance 133 remain authenticated with the authentication service 223. For example, the client connection service 106 may be configured to interact with the authentication service 223 to request validation of an access token received from an instance. In response to a determination that instance does not remain authenticated with the authentication service 223, the client connection service 106 is configured to terminate one or more connections currently maintained for the instance. In some examples, instances (such as the first instance 131 and/or the second instance 133) may be configured to periodically interact with the authentication service 223 to ensure they remain authenticated with the authentication service 223, such as by refreshing or extending an access token previous obtained from the authentication service 223. By having the client connection service 106 periodically determine whether instances remain authenticated, the client connection service 106 prevents abuse by instances and instances do have to be configured to perform explicit unbinding or unpairing actions with the client connection service 106.

Figure 8A:
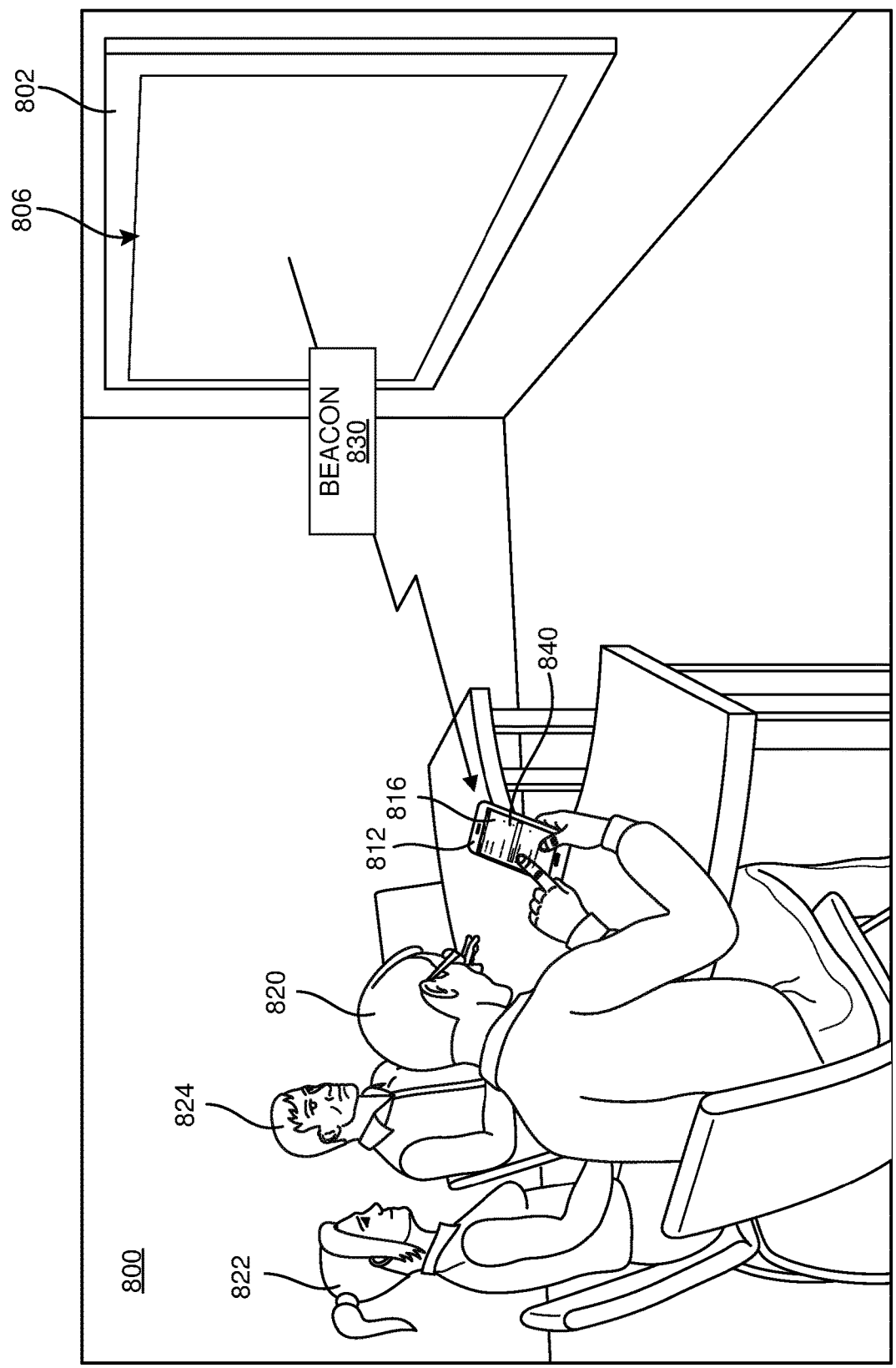
FIGS. 8A and 8B illustrate an example of a second user initiating a casting session of an electronic content item from a fourth device to a third device.
Figure 8B:
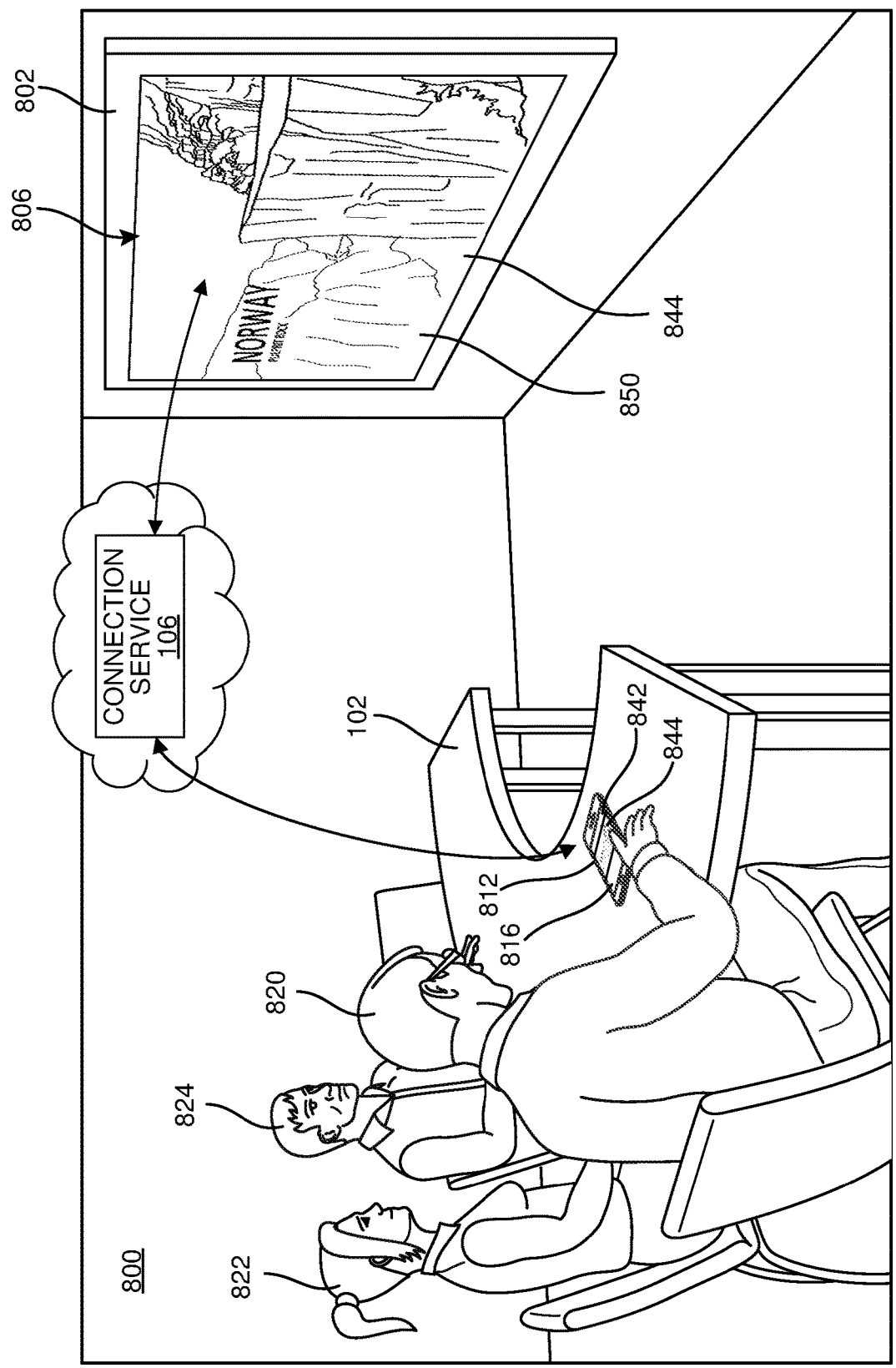

The client connection service 230 may be configured to enable communications between a user computing device and a target device not associated with any particular user, but instead available for on-demand pairing with various users. For example, the target device may include a large format display suitable for viewing at a distance. This capability may be in addition to, or instead of, enabling communications between user computing devices, as discussed in connection with FIGS. 1A-7. FIGS. 8A and 8B illustrate an example of a second user 820 (who may be referred to as a "first attendee" or "first participant") initiating a casting session of a first electronic content item 844 (which may be referred to as an "electronic content" or "content") from a fourth device 812 (which may be referred to as a "participant device," "user computing device," or "user device") to a third device 802 (which may be referred to as a "casting target device," "target device," or "casting target"). It is understood that a file or a document is an example of an electronic content item. The example shown in FIGS. 8A and 8B is in an environment 800, which is a conference room with the third device 802 and a table permanently located therein. The second user 820 is seated at the table, as are a second attendee 822 and a third attendee 824. The attendees 820, 822, and 824 may be in the environment 800 for a scheduled or unscheduled meeting together. At the time shown in FIG. 8A, a first display device 806 (which may be referred to as a "display") included in the third device 802 is not being used in connection with the meeting. For example, the third device 802 may be in a reduced power sleep state in which the display 806 is powered off. The display 806 offers a large display area well suited for viewing from a distance.

Figure 8C:
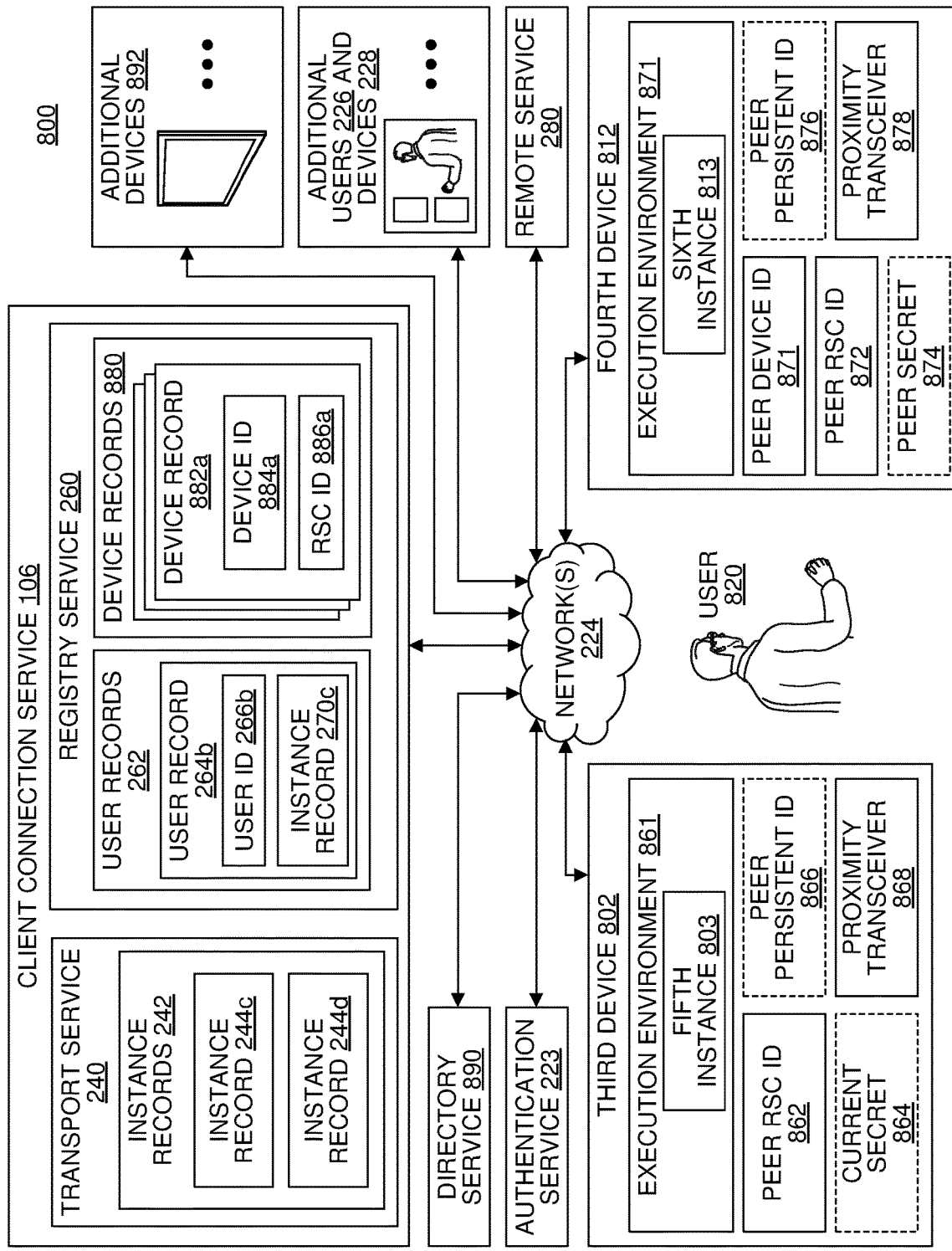
FIG. 8C illustrates an example of a system for establishing secure and resilient persistent network connections between user devices and target devices.

In FIG. 8A, the second user 820 wishes to display and discuss the first electronic content item 844, which is accessible via the fourth device 812, with the other attendees 822 and 824. In this example, the fourth device 812 is in a form of a handheld portable smartphone computing device, although the fourth device 812 may in embodied in other forms, such as, but not limited to, a tablet computer, a notebook or laptop computer, a desktop computer, and/or a console computing device (for example, a console provided on the table). As shown in FIG. 8C, the second participant device 812 includes a fourth application 813, which may be configured to obtain and render the first electronic content 844 (for example, in a form of an electronic file stored in a local storage included in the fourth device 812 or retrieved from a network-accessible storage service) natively by using computation resources included in the fourth device 812. However, although the fourth device 812 may be effective for individual use for viewing and/or editing the first electronic content 844, in the context of the meeting shown in FIGS. 8A and 8B it would be much more effective for the first electronic content 844 to be rendered by the third device 802 on the display 806 for viewing by all of the attendees 820, 822, and 824. In FIG. 8A, the second user 820 is interacting with a first user interface (UI) 840 being presented on a display 816 included in the fourth device 812.

As shown in FIG. 8A, in this example, the third device 802 is configured to periodically transmit a first beacon signal 830 (which may be referred to as a "beacon") to indicate its presence as a pairing-capable device. In some implementations, the first beacon signal 830 is generated by a presence transceiver included in the third device 802, with the first beacon signal 830 being generated in the form of a short range signal, such as a short-range wireless signal; for example, via Bluetooth Low Energy (BLE), an acoustic signal (including, but not limited to, ultrasound), and/or an optical signal. In response to receiving the first beacon signal 830, the fourth device 812 determines the third device 802 is present as a pairing-capable device, and presents via the first UI 840 an option to initiate casting to the third device 802. Then, via the first UI 840, the second user 820 initiates casting of the first electronic content 844 to the third device 802.

In response to the initiation of casting in FIG. 8A, in FIG. 8B casting of the first electronic content 844 in a first casting session has begun, with the second user 820 being the "presenter" of the casting session. This is performed via the client connection service 106 through pairing the third device 802 and the fourth device 812 and forwarding messages between the two devices 802 and 812. The first electronic content 844 (in this example, a slide deck for a presentation application such as Microsoft PowerPoint™) is rendered in a second UI 842 on the display 816 by a fourth application executing on the fourth device 812. At the same time and during the illustrated casting session, the first electronic content 844 is rendered in a third UI 850 on the display 806 by a third application executing on the third device 802. By use of the third application on the third device 802, rendering of the first electronic content 844 is not tied to the rendering resolution, quality, and capabilities of the fourth device 812, as would generally occur if casting were performed by "screencasting" graphical contents of the display 816.

During the casting session, actions performed by the second user 820 that affect rendering of the first electronic content 844 on the fourth device 812 are identified, encoded, and transmitted by the fourth device 812 to the third device 802 via the client connection service 106. In response to receiving the encoded actions, the third device 802 performs equivalent actions via the third application, and as a result affects the rendering of the first electronic content 844 by the third device 802 in parallel with the actions performed on the fourth device 812. The encoded actions may include navigation actions (for example, next page or scrolling actions) that change which subportion of the first electronic content 844 is being rendered. The encoded actions may include editing actions that change portions of the first electronic content 844, such as, but not limited to, adding or removing text, adding, removing, resizing, and moving graphical components, and formatting actions (such as, but not limited to, character formatting and paragraph formatting). By modifying the rendering of the first electronic content 844 on the display 806 in response to received actions in real-time, the third device 802 offers an engaging canvas for collaborative discussion of the first electronic content 844.

FIG. 8C illustrates an example of a system 800 for establishing secure and resilient persistent network connections between user devices and target devices. For example, the system 800 may be used to implement casting between the third device 802 and the fourth device 812 as shown in FIGS. 8A and 8B, although use of device connection established by the system 800 is not limited to casting. The system 800 includes a number of features shown in FIG. 2, including the client connection service 106, transport service 240, registry service 260, network(s) 224, additional users 226 and devices 228, authentication service 223, and remote service 280. In the system 800, the transport service 240 is configured to manage instance records 242, as described in connection with FIGS. 2-7. In this example, the instance records 242 include a fifth instance record 244c associated with the third device 802, and a sixth instance record 244d associated with the fourth device 812. The third and sixth instance records 244a and 244b may include items corresponding to any of the items included in the first instance record 244a.

In some implementations, the transport service 240 is configured to access a directory service 890 to determine if a user, or an instance associated with a user, is permitted to connect to a device such as the third device 802. For example, the directory service 890 and/or the transport service 240 may maintain device, group, organization, and/or role access policies used by the transport service 240 and/or the third device 802 to determine if an instance is permitted to connect to the third device 802. In some examples, a device may be associated to one or more groups and/or organizations maintained by the directory service 890, and an instance may not be permitted to connect to a device based on a user associated with the instance not being included in a group or organization associated with the device and/or the user not being associated with one or more particular roles.

In the system 800, the registry service 260 is configured to manage user records 262, as described in FIGS. 2-7. In this example, the user records 262 include a second user record 264b associated with the second user 820. The second user record 264b may include items corresponding to any of the items included in the first user record 264a; for example, the second user record 264b includes a fourth user identifier 266b (for the second user 820) and a fifth instance record 270c (for the fourth device 812). The registry service 260 is further is configured to manage device records 880 for devices that are not associated with a particular user, such as the third device 802 and additional devices 892. In this example, the device records 880 include a first device record 882a associated with the third device 802. The first device record 882a includes a device identifier 884a for the third device 802 and a fifth resource identifier 886a assigned by the transport service 240 to the third device 802, much as the third and fourth resource identifiers 274a and 274b in FIG. 2 are described as being assigned to their respective first and second devices 130 and 132.

Much like the first device 130, the third device 802 includes a third execution environment 861 in which a third software program instance 803 is executed by the third device 802, the fifth instance 803 maintains a third peer resource identifier 862 for a peer instance of the fifth instance 803, and the fifth instance 803 may maintain a third peer persistent identifier 866 for the peer instance. In some examples, the fifth instance 803 may maintain a current secret 864 used to generate data included in broadcast messages transmitted by the fifth instance 803 via a first proximity transceiver 868 included in the third device 802.

Much like the first device 130, the fourth device 812 includes a fourth execution environment 871 in which a fourth software program instance 813 is executed by the fourth device 812, the sixth instance 813 maintains a fourth peer resource identifier 872 for a peer instance of the sixth instance 813, and the sixth instance 813 may maintain a fourth peer persistent identifier 876 for the peer instance. For a connection with an instance not associated with a particular user, such as the fifth instance 803, the sixth instance 813 may be configured to maintain a peer device identifier 871 (storing a device identifier for the paired instance) and/or a peer secret 874 (for communicating with the paired instance). In some examples, the sixth instance 813 can be paired with instances executing on other user computing devices, such as the additional devices 228. The fourth device 812 includes a second proximity transceiver 878 used by the sixth instance 813 to detect proximity to other devices; for example, by receiving a broadcast message transmitted by the third device 802.

It is understood that although FIGS. 8A, 8C, 9, and 10 illustrate examples in which the first proximity transceiver 868 transmits a beacon signal (for example, the first beacon signal 830 in FIG. 8A) received by the second proximity transceiver 878 to perform proximity detection between the third and fourth devices 802 and 812, other schemes can be employed by which the first and second proximity transceivers 868 and 878 interact to perform proximity detection. By way of a first example, the second proximity transceiver 878 may transmit beacon signals received by the first proximity transceiver. By way of a second example, the first and second proximity transceivers 868 and 878 may both receive signals, such as signals generated by a wireless communication device, and determine the third and fourth devices 802 and 812 are mutually proximate to the wireless communication device based on the received signals.

Figure 9:
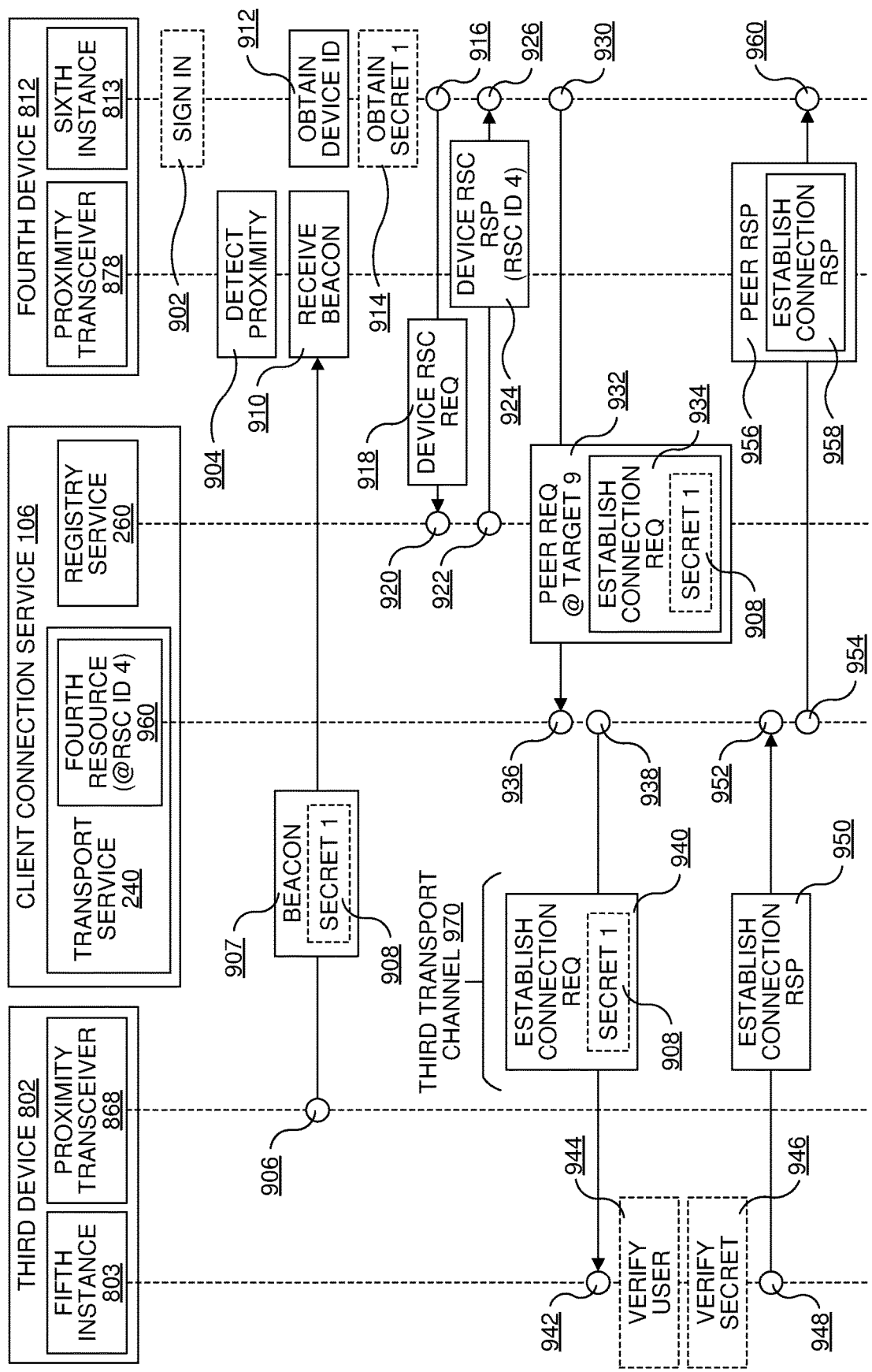
FIG. 9 illustrates an example of a pairing procedure between a two instances performed via the client connection service shown in FIG. 8.

FIG. 9 illustrates an example of a pairing procedure between the fifth instance 803 and the sixth instance 813 performed via the client connection service 106 shown in FIG. 8. For purposes of discussion, it is assumed that both the third and sixth instances 803 and 813 have been bound to the client connection service 106, much as previously described in FIG. 3. The binding of the fifth instance 803 includes registration with the registry service 260 to create or update the device record 882a associated with the fifth instance 803, and as a result associating, at the registry service 260, the device identifier 884a for the fifth instance 803 with the fifth resource identifier 886a (labeled "RSC ID 4") for the fourth resource 960 currently assigned by the transport service 240 to the fifth instance 803. The binding of the sixth instance 813 may include an operation 902 in which the second user 820 signs into the authentication service 223 via the sixth instance 813 or the fourth device 812.

At operation 904, the sixth instance 904 uses the second proximity transceiver 878 to detect other devices that are in proximity to the fourth device 812. Much as described for the first beacon signal 830 in FIG. 8A, at operation 906 the fifth instance 803 transmits a second beacon signal 907 including a device identifier for the third device 802. In some implementations, an instance identifier may be used instead of a device identifier. In some implementations, a first secret 908 (labeled "SECRET 1") is encoded in the second beacon signal 907; for example, the first secret 908 may be a key value. At operation 910, the sixth instance 813 receives the second beacon signal 907 via the second proximity transceiver 878 and, at operation 912, the sixth instance 813 obtains the device identifier from the beacon signal 907, storing it as the peer device identifier 871. In an implementation in which the beacon signal 907 includes the first secret 908, at operation 914 the sixth instance 813 obtains the first secret 908 from the beacon signal 907, storing it as the peer secret 874.

Similar to the use of the first list endpoints request 404 to obtain a resource identifier described in FIG. 4, at operation 916 the sixth instance 813 transmits a device resource request 918 (labeled "DEVICE RSC REQUEST") to the registry service 260, requesting the resource identifier associated with the device identifier received in the second beacon signal 907. At operation 920, the registry service 260 receives and processes the device resource request 918 to identify the device record 880 including the device identifier identified by the device resource request 918. In this example, the registry service 260 identifies the device record 882a for the fifth instance 803. At operation 922, the registry service 260 transmits a device resource response 924 to the sixth instance 813 as a response to the device resource request 918. The device resource response 924 includes information obtained from the identified device record 882a, including the fifth resource identifier 886a assigned to the fifth instance 803. In some implementations, the second beacon signal 907 includes the resource identifier assigned to the fifth instance 813 and, at operation 926, the resource identifier is instead obtained from the beacon signal 907, and operations 916, 920, and 922 are omitted. In some implementations, in response to a determination that the third device 802 is in proximity to the fourth device 812 and before proceeding with operation 916 or operation 930, the sixth instance 813 presents a user interface to the second user 820 allowing the second user 820 to initiate pairing with the fifth instance, and the sixth instance 813 receives a user input requesting the sixth instance 813 be paired with the fifth instance 803.

At operation 930, the sixth instance 813 is configured to identify a ninth target resource (labeled "TARGET 9") based on the resource identifier 872 included in the device resource response 924 for the fifth instance 803. A ninth peer request 932, which includes a second establish connection request 934 for forwarding to the fifth instance 803, is sent to the tenth target resource, much as described for operation 420 in FIG. 4. At operation 936, the transport service 240 receives and processes the ninth peer request 932, and at operation 938 transmits a second forwarded establish connection request 940 (generated based on the second establish connection request 934) to the fifth instance 803 via a third transport channel 970 between the transport service 240 and the fifth instance 803, much as described for operations 426 and 430 in FIG. 4. At operation 942, the fifth instance 803 receives and processes the second forwarded establish connection request 940, much as described for operations 434 and 438 in FIG. 4. In some examples, the operation 942 includes an operation 942 in which the fifth instance 803 verifies that the sixth instance 813 is associated with a user identifier (which may be included in the second forwarded establish connection request 940) is permitted to connect to the fifth instance 803. For example, as discussed in FIG. 8C, the fifth instance 803 may be configured to interact with the directory service 890 to verify the user identifier. In response to a positive verification, the fifth instance 803 continues with processing the second forwarded establish connection request 940 and connecting with the sixth instance 813.

In an implementation in which the sixth instance 813 received the first secret 908 from the second beacon signal 907, the establish connection request 934 and the second forwarded establish connection request 940 are encoded according to the first secret 908. In some examples, the first secret 908 is simply included as a portion of the requests 934 and 940, such as part of a key/value pair. In some examples, a portion of the requests 934 and 940 is encrypted based on the first secret 908, such as by using the first secret 908 as an encryption key. In some examples, the requests 934 and 940 include a signature generated based on the first secret 908, such as a cryptographic signature of a payload portion with the first secret 908 used as a salt value. At operation 946 included in operation 942, the fifth instance 802 verifies that the second forwarded establish connection request 940 was encoded according to the current secret 864 (which in this example is the same as the first secret 908). A successful verification allows the fifth instance 803 to determine that the sixth instance 813 was in sufficient proximity to the third device 802 to receive a beacon signal transmitted by the third device 802. In response to a positive verification, the fifth instance 803 continues with processing the second forwarded establish connection request 940 and connecting with the sixth instance 813.

Much as previously described for operations 440, 444, 446, and 452 in FIG. 4, the pairing process between the fifth instance 803 and the sixth instance 813 is completed by transmitting a third establish connection response 950 at operation 948, receiving and processing the third establish connection response 950 at operation 952, transmitting a fourth peer response 956 including a fourth establish connection response 958 at operation 954, and receiving and processing the fourth peer response 956 at the sixth instance 813 at operation 960.

Figure 10:
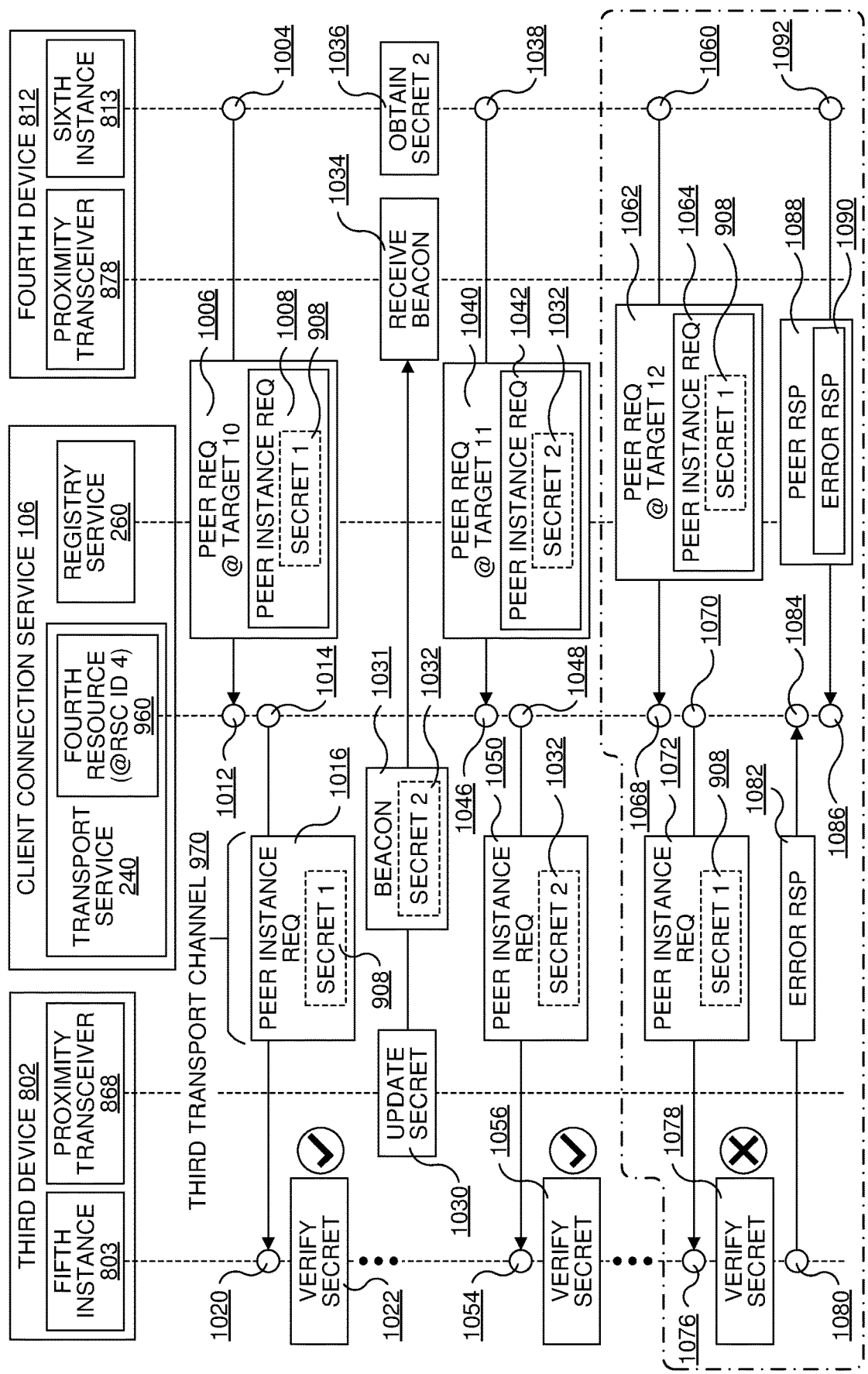
FIG. 10 illustrates an example in which a secret required for communicating with a paired device is periodically updated.

Continuing from the example in FIG. 9 with the third and sixth instances 803 and 813 paired, FIG. 10 illustrates an example in which a secret required for communicating with a paired device is periodically updated. In this example, the fifth instance 803 is configured to periodically transmit a beacon signal, much as described for the second beacon signal 907, via the first proximity transceiver 868. The periodically transmitted beacon signal includes the current secret 864, which the fifth instance 803 is configured to periodically update to a new value. Accordingly, beacon signals transmitted by the fifth instance 803 include a secret that continually changes over time.

At operation 1004, the sixth instance 813 transmits a tenth peer request 1006 including a fifth peer instance request 1008, much as described for operation 504 in FIG. 5. In this example, the current secret 864 is still the first secret 908 from FIG. 9, and the fifth peer instance request 1008 is encoded according to the first secret 908, much as described in FIG. 9. Much as described for operations 936, 938, 942, and 946 in FIG. 9, the transport service 240 receives and processes the tenth peer request 1006 at operation 1012 and transmits a fifth forwarded peer instance request 1016 (generated based on the fifth peer instance request 1008) via the third transport channel 970 at operation 1014, and the fifth instance 803 receives and processes the fifth forwarded peer instance request 1016 at operation 1020, which includes an operation 1022 in which the fifth instance 803 verifies that the fifth forwarded peer instance request 1016 is encoded according to the current secret 864. From there, processing of the fifth forwarded peer instance request 1016 continues much as in the examples shown in FIGS. 5, 6, and/or 7.

At a later time, the fifth instance 803 performs a periodic update of the current secret 864, changing it from the first secret 908 to a different second secret 1032 (labeled "SECRET 2"). Then, at an operation 1030, the fifth instance 803 transmits a third beacon signal 1031 including the second secret 1032. At operation 1034, the sixth instance 813 receives the third beacon signal 1031 and, at operation 1036, updates peer secret 874 to the second secret 1032 included in the third beacon signal 1031. Operations 1038, 1046, 1048, 1054, and 1056 directly correspond to the operations 1004, 1012, 1014, 1020, and 1022. However, in operations 1038 through 1056, a sixth peer instance request 1042 (included in an eleventh peer request 1040) and a corresponding sixth forwarded peer instance request 1050 are encoded based on the second secret 1032 included in the third beacon signal 1031. By updating the current secret 864, transmitting the current secret 864 is beacon signals, and verifying that messages received from a paired instance are encoded based on the current secret 864, the fifth instance 803 as able to confirm that the fourth device 812 has remained in proximity to the third device 802, as otherwise it would not receive the updated secret required for encoding messages to the fifth instance 803.

To further illustrate the point, operations 1060 through 1092 illustrate an alternative example to operations 1034 through 1056. In this example, although the current secret 864 has been updated to the second secret 1032 and the third beacon signal 1031 including the new secret 1032 was transmitted by the fifth instance 802, the sixth instance 812 did not receive the third beacon signal 1031 and as a result is continuing to use the first secret 908. Operations 1060, 1068, and 1070 directly correspond with operations 1004, 1012, and 1014, including encoding a seventh peer instance request 1064 (included in a twelfth peer request 1062) and a seventh forwarded peer instance request 1072 based on the first secret 908. However, at operation 1078 the fifth instance 803 fails to verify that the seventh forwarded peer instance request 1072 received at operation 1076 was encoded based on the current secret 864 (which, at that time, is the second secret 1032). In response to the failed verification, the fifth instance 803 does not continue processing the seventh forwarded peer instance request 1072, and at operation 1080 instead transmits an error response 1082 as a response to the seventh forwarded peer instance request 1072. At operation 1086, the transport service 240 transmits a fifth peer response 1088 (including an error response 1090 generated based on the error response 1082 received at operation 1084) as a response to the twelfth peer request 1062. The sixth instance 813 receives the fifth peer response 1088 at operation 1092. Accordingly, the failure of the sixth instance 813 to receive and make use of the second secret 1032 prevents it from continuing to communicate with the fifth instance 803.

In some examples, the fifth instance 803 is configured to automatically terminate a pairing connection with the sixth instance 813 in response to receiving a predetermined number of messages (which may be a predetermined number of successive messages) from the paired sixth instance 813 that are not successfully verified as having been encoded based on the current secret 864 and/or after a predetermined amount of time has passed since a successfully verified message has been received from the paired sixth instance 813.

Figure 11:
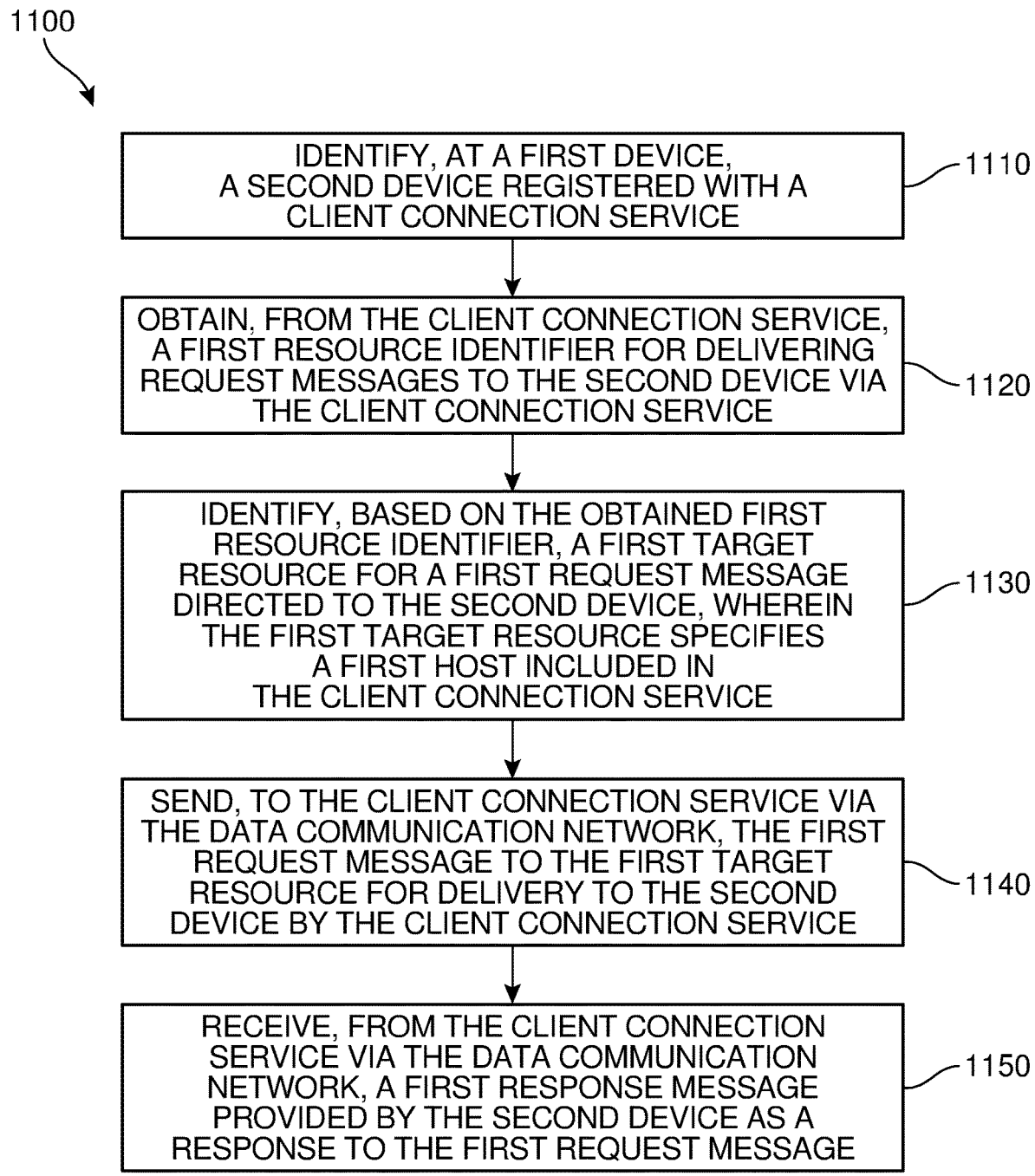
FIG. 11 is a flow chart illustrating an implementation of an example process for communicating between instances via a client connection service.

FIG. 11 is a flow chart illustrating an implementation of an example process 1100 for communicating between instances via a client connection service. In some examples, some or all of the process 1100 may be performed in combination with any of the features discussed in connection with FIGS. 1-10, 13, and 14, although they may also be performed with any other features described herein. In FIG. 11, a first operation 1110 may include identifying, at a first device, a second device registered with the client connection service, wherein the second device is different than the first device. In a second operation 1120, the process 1100 may include obtaining, at the first device from the client connection service via a data communication network, a first resource identifier for delivering request messages to the second device via the client connection service. In a third operation 1130, the process 1100 may include identifying, at the first device based on the obtained first resource identifier, a first target resource for a first request message directed to the second device, wherein the first target resource specifies a first host included in the client connection service. In a fourth operation 1140, the process 1100 includes sending, by the first device to the client connection service via the data communication network, the first request message to the first target resource for delivery to the second device by the client connection service. In a fifth operation 1150, the process 1100 includes receiving, at the first device from the client connection service via the data communication network, a first response message provided by the second device as a response to the first request message.

Figure 12:
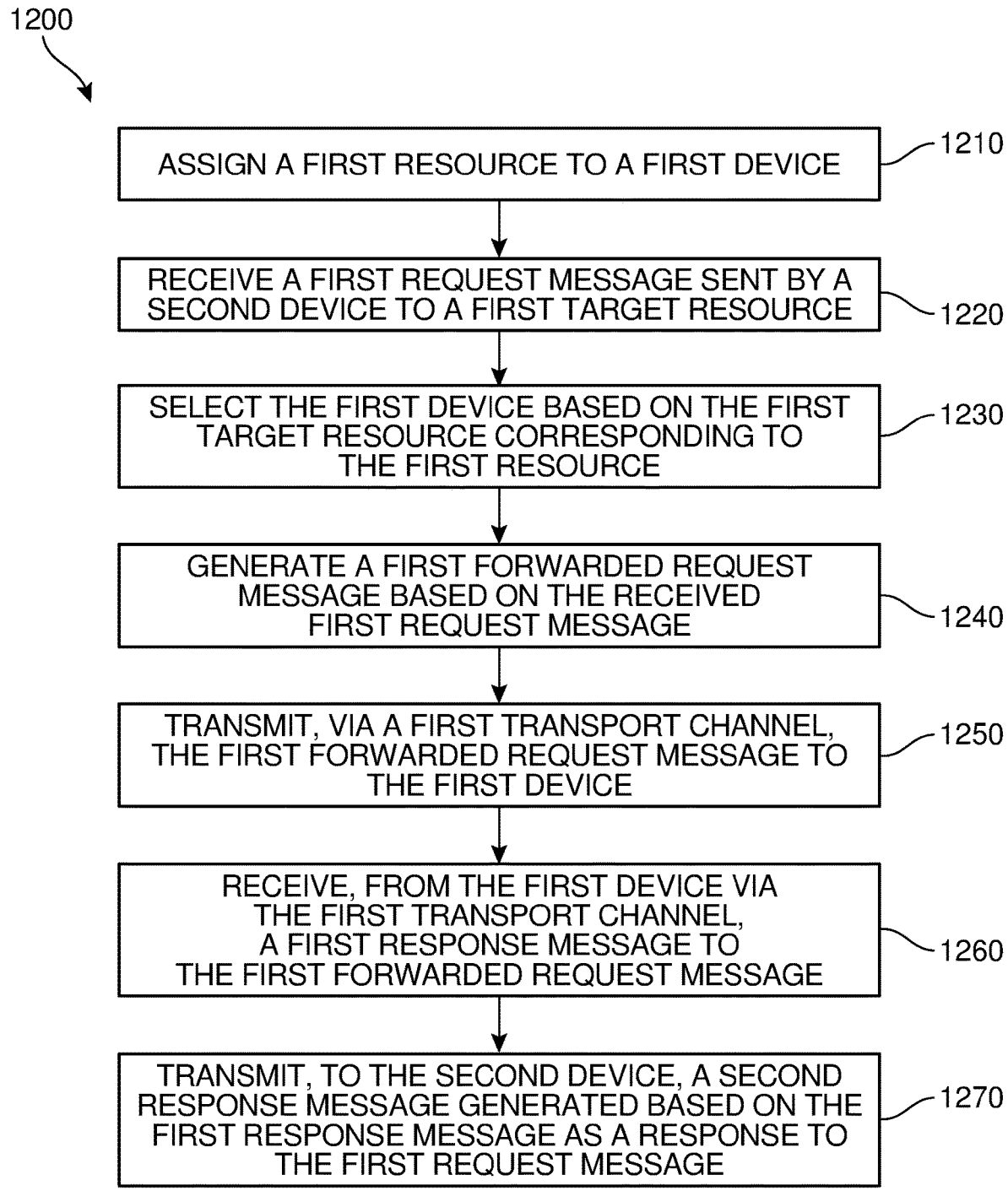
FIG. 12 is a flow chart illustrating an implementation of an example process for communicating between instances via a client connection service.

FIG. 12 is a flow chart illustrating an implementation of an example process 1200 for communicating between instances via a client connection service. In some examples, some or all of the process 1200 may be performed in combination with any of the features discussed in connection with FIGS. 1-10, 13, and 14, although they may also be performed with any other features described herein. In FIG. 12, a first operation 1210 may include assigning, by the client connection service, a first resource to a first device. In a second operation 1220, the process 1200 may include receiving, at the client connection service, a first request message sent by a second device to a first target resource, wherein the second device is different than the first device. In a third operation 1130, the process 1200 may include selecting the first device based on the first target resource corresponding to the first resource. In a fourth operation 1140, the process 1200 includes generating, by the client connection service, a first forwarded request message based on the received first request message. In a fifth operation 1250, the process 1200 includes transmitting, via a first transport channel, the first forwarded request message from the client connection service to the first device. In a sixth operation 1260, the process 1200 includes receiving, at the client connection service from the first device via the first transport channel, a first response message to the first forwarded request message. In a seventh operation 1270, the process 1200 includes transmitting, from the client connection service to the second device, a second response message generated based on the first response message as a response to the first request message.

The detailed examples of systems, devices, and techniques described in connection with FIGS. 1-12 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1-12 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 13:
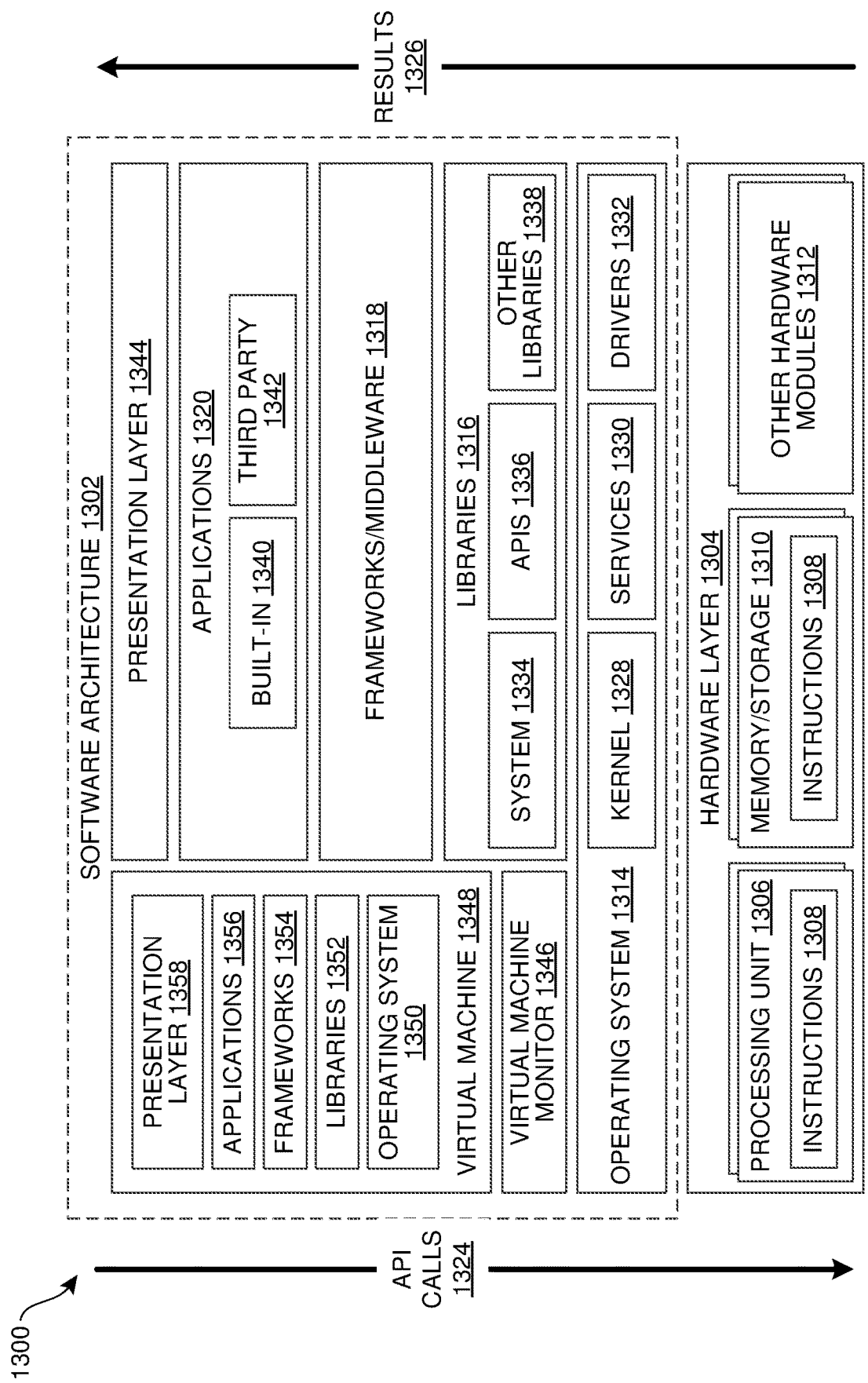
FIG. 13 is a block diagram illustrating an example software architecture, various portions of which may be used in conjunction with various hardware architectures herein described, which may implement any of the features herein described.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware such as a machine 1400 of FIG. 14 that includes, among other things, processors 1410, memory 1430, and input/output (I/O) components 1450. A representative hardware layer 1304 is illustrated and can represent, for example, the machine 1400 of FIG. 14. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1348. The virtual machine 1348 provides an execution environment where applications/modules can execute as if they were executing on a hardware machine (such as the machine 1400 of FIG. 14, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1302 outside of the virtual machine, executes within the virtual machine 1348 such as an OS 1350, libraries 1352, frameworks 1354, applications 1356, and/or a presentation layer 1358.

Figure 14:
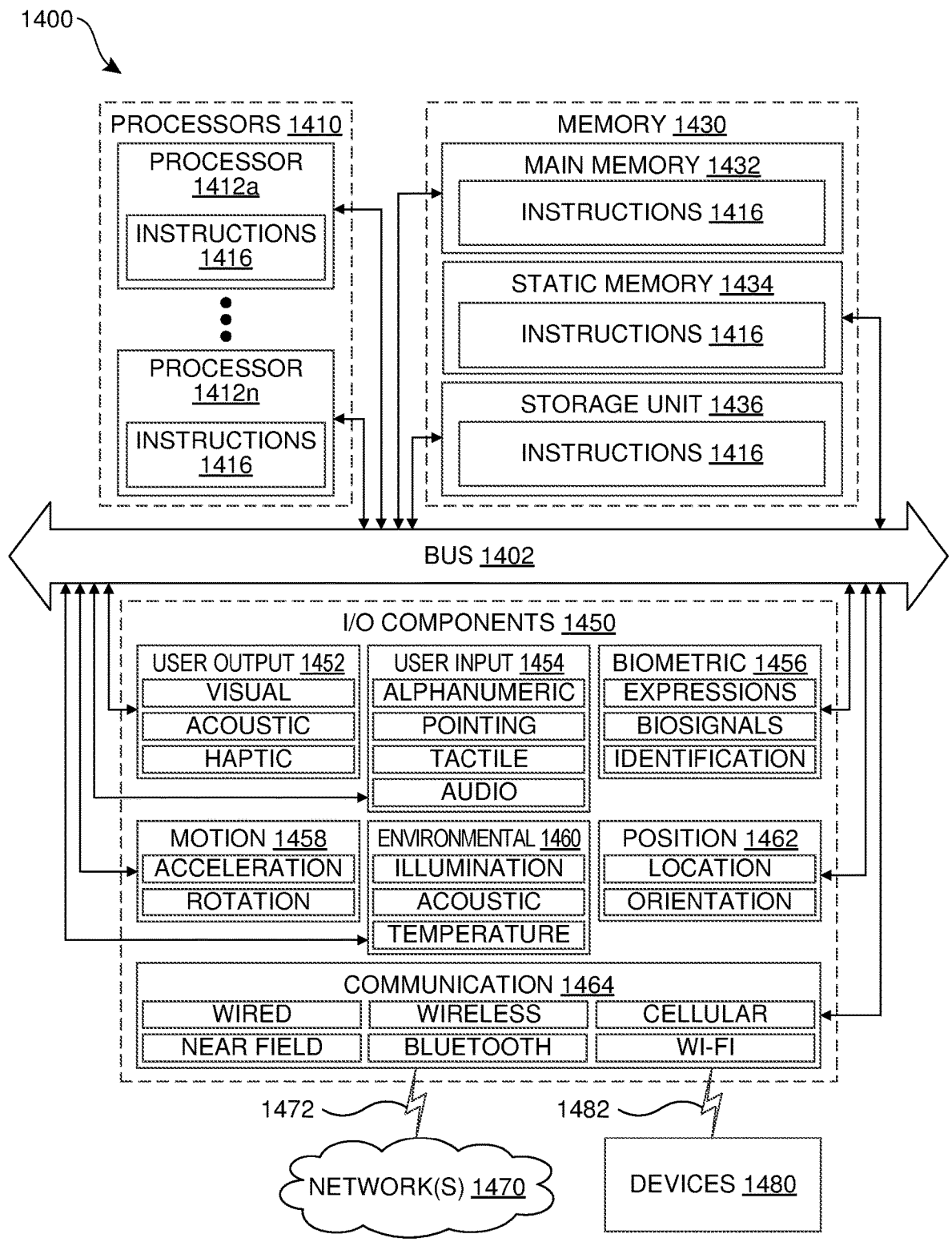
FIG. 14 is a block diagram illustrating components of an example machine configured to read instructions from a machine-readable medium and perform any of the features described herein.

FIG. 14 is a block diagram illustrating components of an example machine 1400 configured to read instructions from a machine-readable medium (for example, a machine-readable storage medium) and perform any of the features described herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" include a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors 1412a to 1412n that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within memory at least one of I/O components 1450, or any suitable combination thereof, during execution thereof. Accordingly, the memory 1432, 1434, the storage unit 1436, memory in processors 1410, and memory in I/O components 1450 are examples of machine-readable media.

As used herein, "machine-readable medium" refers to a device able to temporarily or permanently store instructions and data that cause machine 1400 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456, motion components 1458, environmental components 1460, and/or position components 1462, among a wide array of other physical sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1458 may include, for example, acceleration sensors (for example, an accelerometer) and rotation sensors (for example, a gyroscope). The environmental components 1460 may include, for example, illumination sensors, temperature sensors, humidity sensors, pressure sensors (for example, a barometer), acoustic sensors (for example, a microphone used to detect ambient noise), physical proximity sensors (for example, infrared sensing of nearby objects), and/or other components that may provide indications, measurements, or signals corresponding to a surrounding physical environment. The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network(s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1462, such as, but not limited to, geo-location via Internet Protocol (IP) address, location via Wi-Fi, cellular, NFC, Bluetooth, or other wireless station identification and/or signal triangulation.

Copending and commonly owned U.S. patent application Ser. No. 16/724,111 (entitled "UNIFIED INTERFACES FOR PAIRED USER COMPUTING DEVICES" and filed on Dec. 20, 2019) and Ser. No. 16/724,116 (entitled "TELE-CONFERENCING INTERFACES AND CONTROLS FOR PAIRED USER COMPUTING DEVICES" and filed on Dec. 20, 2019) are both incorporated by reference herein in their entireties.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method comprising:
    receiving bind requests from a first device, which is executing a first software instance, and a second device, which is executing a second software instance, the bind requests being received at a transport service of a client connection service and the second device being different from the first device and being configured to communicate with the first device via the client connection service, wherein the bind requests are configured for binding and registering the first and second software instances with the client connection service;
    creating instance records of the first and second software instances bound to the transport service in response to the bind requests from the first and second devices, respectively;
    maintaining a registry of the first and second software instances that have instance records created in the transport service of the client connection service, the registry being maintained in a registry service of the client connection service;
    assigning, by the client connection service, a first resource to the first device;
    providing target resources, via the transport service, including a first target resource, for exchanging messages between the first device and the second device after the instance records have been created in the transport service and registered in the registry service;
    receiving, at the client connection service, a first request message sent by the second device, to the first target resource;
    selecting the first device to respond to the first request message sent by the second device based on the first target resource corresponding to the first resource;
    generating, by the client connection service, a first forwarded request message based on the received first request message;
    transmitting the first forwarded request message from the client connection service to the first device;
    receiving, at the client connection service from the first device, a first response message to the first forwarded request message; and
    transmitting, from the client connection service to the second device, a second response message generated based on the first response message as a response to the first request message.

2. The method of claim 1, wherein transmitting the first forwarded request message is carried out via a first transport channel.

3. The method of claim 2, further comprising:
    assigning by the client connection service, a second resource to the second device, wherein the second resource is different from the first resource;
    receiving, at the client connection service, a second request message sent by the first device to a second target resource;
    selecting the second device based on the second target resource corresponding to the second resource;
    generating, by the client connection service, a second forwarded request message based on the received second request message; and
    transmitting, via a second transport channel, the second forwarded request message from the client connection service to the second device.

4. The method of claim 3, further comprising:
    receiving, at the client connection service from the second device via the second transport channel, a third response message to the second forwarded request message; and
    transmitting, from the client connection service to the first device, a fourth response message generated based on the third response message in response to the second request message.

5. The method of claim 2, further comprising:
    receiving, at the client connection service after the client connection service has received the first request message, a second request message sent by the second device to a second target resource;
    selecting the first device based on the second target resource corresponding to the first resource;
    generating, by the client connection service, a second forwarded request message based on the received second request message; and
    transmitting, via a second transport channel different from the first transport channel, the second forwarded request message from the client connection service to the first device.

6. The method of claim 2, further comprising:
    assigning, by the client connection service, a second resource to the first device, wherein the second resource is different from the first resource;
    receiving, at the client connection service, a second request message sent by the second device to a second target resource;

selecting the first device based on the second target resource corresponding to the first resource;

generating, by the client connection service, a second forwarded request message based on the received second request message; and transmitting, via the first transport channel, the second forwarded request message from the client connection service to the first device.

7. The method of claim 6, further comprising:

receiving, at the client connection service from the first device via the first transport channel, a third response message to the second forwarded request message; and transmitting, from the client connection service to the second device, a fourth response message generated based on the third response message as a response to the second request message.

8. The method of claim 1 further comprising:

obtaining a first user identifier associated with the first device;

obtaining a second user identifier associated with the second device; and determining, before the transmission of the first forwarded request message, that the first user identifier is the same as the second user identifier.

9. The method of claim 8, wherein the first forwarded request message is transmitted based on the determination that the first user identifier is the same as the second user identifier.

10. The method of claim 1, further comprising:

authenticating the first device with an authentication service in association with a first user identifier; and providing, to the client connection service, a first token reflecting the authentication of the first device with the authentication service.

11. The method of claim 1, further comprising:

receiving a beacon signal from the second device, the beacon signal including a device identifier and a secret; and encoding the first request message based on the received secret.

12. The method of claim 11, further comprising obtaining a first resource identifier by requesting, from the registry, a resource identifier associated with the received device identifier.

13. The method of claim 1 wherein the first and second software instances are comprised of teleconferencing session software applications configured to be bound to the transport service of the client connection service for permitting communication between the first and second device during a teleconferencing session.

14. The method of claim 1, wherein the bind requests include data identifying permitted peer targets.

15. The method of claim 1, wherein the bind requests include connection information including at least one of: a network address; a port number; and a secret value to be included in the first request message.

16. The method of claim 1, wherein the bind requests include user information including at least one of: a user identifier; and a token issued by an authentication service.

17. The method of claim 1, wherein the bind requests are configured so that the first device can perform a first activity using the first instance and the second device can perform a second activity, different than the first activity, using the second instance.

18. A client connection service for facilitating a teleconferencing session between a first device and a second device, comprising:

a processor; and a machine-readable medium storing instructions therein which, when executed by the processor, cause the processor to:

receive bind requests from the first device, which is executing a first software instance, and the second device, which is executing a second software instance, the bind requests being received at a transport service of the client connection service and the second device being different from the first device and being configured to communicate with the first device via the client connection service, wherein the bind requests are configured for binding and registering the first and second software instances with the client connection service;

create instance records of the first and second software instances bound to the transport service in response to the bind requests from the first and second devices, respectively;

maintain a registry of the first and second software instances that have instance records created in the transport service of the client connection service, the registry being maintained in a registry service of the client connection service;

assign, by the client connection service, a first resource to the first device;

provide target resources, via the transport service, including a first target resource, for exchanging messages between the first device and the second device after the instance records have been created in the transport service and registered in the registry service;

receive, at the client connection service, a first request message sent by the second device, to the first target resource;

select the first device to respond to the first request message sent by the second device based on the first target resource corresponding to the first resource;

generate, by the client connection service, a first forwarded request message based on the received first request message;

transmit the first forwarded request message from the client connection service to the first device;

receive, at the client connection service from the first device, a first response message to the first forwarded request message; and transmit, from the client connection service to the second device, a second response message generated based on the first response message as a response to the first request message.

19. The client connection service of claim 18, wherein transmitting the first forwarded request message is carried out via a first transport channel.

20. The client connection service of claim 19, wherein the instructions, when executed by the processor, further cause the processor to:

assign by the client connection service, a second resource to the second device, wherein the second resource is different from the first resource;

receive, at the client connection service, a second request message sent by the first device to a second target resource;

select the second device based on the second target resource corresponding to the second resource;

generate, by the client connection service, a second forwarded request message based on the received second request message; and transmit, via a second transport channel, the second forwarded request message from the client connection service to the second device.

21. The client connection service of claim 20, wherein the instructions, when executed by the processor, further cause the processor to:
receive, at the client connection service from the second device via the second transport channel, a third response message to the second forwarded request message; and transmitting, from the client connection service to the first device, a fourth response message generated based on the third response message as a response to the second request message.

22. The client connection service of claim 18, wherein the instructions, when executed by the processor, further cause the processor to:
obtain a first user identifier associated with the first device;
obtain a second user identifier associated with the second device; and
determine, before the transmission of the first forwarded request message, that the first user identifier is the same as the second user identifier.

23. The client connection service of claim 22, wherein the first forwarded request message is transmitted based on the determination that the first user identifier is the same as the second user identifier.

24. The client connection service of claim 18, wherein the bind requests are configured so that the first device can perform a first activity using the first instance and the second device can perform a second activity, different than the first activity, using the second instance.

25. The method of claim 24, wherein the first and second activities are related to a teleconferencing session.

26. The method of claim 24, wherein the first activity is related to a teleconferencing session and second activity is not related to the teleconferencing session.

27. A computer program product comprised of a machine-readable medium having computer-executable instructions embodied thereon that, when executed by a client connection service having a processor and memory, cause the processor to:
receive bind requests from a first device, which is executing a first software instance, and a second device, which is executing a second software instance, the bind requests being received at a transport service of the client connection service, and the second device being different from the first device and being configured to communicate with the first device via the client connection service, wherein bind requests are respectively configured for binding and registering the first and second software instances with the client connection service;
create instance records of the first and second software instances bound to the transport service in response to the bind requests from the first and second devices, respectively;
maintain a registry of the first and second software instances that have instance records created in the transport service of the client connection service, the registry being maintained in a registry service of the client connection service;
assign, by the client connection service, a first resource to the first device;
provide target resources, via the transport service, including a first target resource, for exchanging messages between the first device and the second device after the instance records have been created in the transport service and registered in the registry service;
receive, at the client connection service, a first request message sent by the second device, to the first target resource;
select the first device to respond to the first request message sent by the second device based on the first target resource corresponding to the first resource;
generate, by the client connection service, a first forwarded request message based on the received first request message;
transmit the first forwarded request message from the client connection service to the first device;
receive, at the client connection service from the first device, a first response message to the first forwarded request message; and
transmit, from the client connection service to the second device, a second response message generated based on the first response message as a response to the first request message.

* * * * *